United States Patent
Guthrie et al.

(10) Patent No.: US 7,523,268 B2
(45) Date of Patent: *Apr. 21, 2009

(54) REDUCING NUMBER OF REJECTED SNOOP REQUESTS BY EXTENDING TIME TO RESPOND TO SNOOP REQUEST

(75) Inventors: Guy L. Guthrie, Austin, TX (US); Hugh Shen, Austin, TX (US); William J. Starke, Round Rock, TX (US); Derek E. Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/114,790

(22) Filed: May 4, 2008

(65) Prior Publication Data

US 2008/0201533 A1   Aug. 21, 2008

Related U.S. Application Data

(63) Continuation of application No. 11/056,764, filed on Feb. 11, 2005, now Pat. No. 7,386,682.

(51) Int. Cl.
  *G06F 12/00* (2006.01)
(52) U.S. Cl. ............... 711/146; 711/141; 711/142; 711/143; 710/107; 710/109; 710/112
(58) Field of Classification Search ......... 711/141–143, 711/146; 710/107, 109, 112
See application file for complete search history.

(56) References Cited

U.S. PATENT DOCUMENTS

| | | | |
|---|---|---|---|
| 4,961,136 A | 10/1990 | Sato | 364/200 |
| 5,740,400 A | 4/1998 | Bowles | 711/144 |
| 6,065,101 A | 5/2000 | Gilda | 711/140 |
| 6,192,458 B1 | 2/2001 | Arimilli et al. | 711/220 |
| 6,202,112 B1 | 3/2001 | Gadagkar et al. | 710/118 |
| 6,470,427 B1 | 10/2002 | Arimilli et al. | 711/137 |
| 6,473,833 B1 | 10/2002 | Arimilli et al. | 711/122 |
| 6,473,837 B1 | 10/2002 | Hughes et al. | 711/146 |
| 6,529,990 B1 | 3/2003 | Kruse et al. | 710/310 |
| 6,587,923 B1 | 7/2003 | Benveniste et al. | 711/122 |
| 6,615,323 B1 | 9/2003 | Petersen et al. | 711/146 |
| 6,779,086 B2 | 8/2004 | Arimilli et al. | 711/141 |
| 6,848,023 B2 | 1/2005 | Teramoto | 711/127 |

*Primary Examiner*—Sanjiv Shah
*Assistant Examiner*—Arpan Savla
(74) *Attorney, Agent, or Firm*—Diana L. Roberts-Gerhardt; Robert A. Voigt, Jr.; Winstead P.C.

(57) ABSTRACT

A cache, system and method for reducing the number of rejected snoop requests. An incoming snoop request is entered in the first available latch in a pipeline of latches in a stall/reorder unit if the stall/reorder unit is not full. The entered snoop request is dispatched to a selector upon entering a bottom latch in the pipeline. The stall/reorder unit is not informed as to whether the dispatched snoop request is accepted by an arbitration mechanism for several clock cycles after the dispatch occurred. A copy of the dispatched snoop request is stored in a top latch in an overrun pipeline of latches in the first unit upon dispatching the snoop request. By maintaining information about the snoop request, the snoop request may be dispatched again to the selector in case the dispatched snoop request was rejected thereby increasing the chance that the snoop request will ultimately be accepted.

13 Claims, 19 Drawing Sheets

REDUCING NUMBER OF REJECTED SNOOP REQUESTS BY EXTENDING TIME TO RESPOND TO SNOOP REQUEST

TECHNICAL FIELD

The present invention relates to the field of caches in a multiprocessor system, and more particularly to reducing the number of rejected snoop requests by extending the time to respond to snoop requests.

BACKGROUND INFORMATION

A multiprocessor system may comprise multiple processors coupled to a common shared system memory. The multiprocessor system may further include one or more levels of cache associated with each processor. A cache includes a relatively small, high speed memory ("cache memory") that contains a copy of information from one or more portions of the system memory. A Level-1 (L1) cache or primary cache may be built into the integrated circuit of the processor. The processor may be associated with additional levels of cache, such as a Level-2 (L2) cache and a Level-3 (L3) cache. These lower level caches, e.g., L2, L3, may be employed to stage data to the L1 cache and typically have progressively larger storage capacities but longer access latencies.

The cache memory may be organized as a collection of spatially mapped, fixed size storage region pools commonly referred to as "congruence classes." Each of these storage region pools typically comprises one or more storage regions of fixed granularity. These storage regions may be freely associated with any equally granular storage region in the system as long as the storage region spatially maps to a congruence class. The position of the storage region within the pool may be referred to as the "set." The intersection of each congruence class and set contains a cache line. The size of the storage granule may be referred to as the "cache line size." A unique tag may be derived from an address of a given storage granule to indicate its residency in a given congruence class and set.

When a processor generates a read request and the requested data resides in its cache memory (e.g., cache memory of L1 cache), then a cache read hit takes place. The processor may then obtain the data from the cache memory without having to access the system memory. If the data is not in the cache memory, then a cache read miss occurs. The memory request may be forwarded to the system memory and the data may subsequently be retrieved from the system memory as would normally be done if the cache did not exist. On a cache miss, the data that is retrieved from the system memory may be provided to the processor and may also be written into the cache memory due to the statistical likelihood that this data will be requested again by that processor. Likewise, if a processor generates a write request, the write data may be written to the cache memory without having to access the system memory over the system bus.

Hence, data may be stored in multiple locations. For example, data may be stored in a cache of a particular processor as well as in system memory. If a processor altered the contents of a system memory location that is duplicated in its cache memory (e.g., cache memory of L1 cache), the cache memory may be said to hold "modified" data. The system memory may be said to hold "stale" or invalid data. Problems may result if another processor (other than the processor whose cache memory is said to hold "modified" data) or bus agent, e.g., Direct Memory Access (DMA) controller, inadvertently obtained this "stale" or invalid data from system memory. Subsequently, it is required that the other processors or other bus agents are provided the most recent copy of data from either the system memory or cache memory where the data resides. This may commonly be referred to as "maintaining cache coherency." In order to maintain cache coherency, therefore, it may be necessary to monitor the system bus to see if another processor or bus agent accesses cacheable system memory. This method of monitoring the system bus is referred to in the art as "snooping."

Each cache may be associated with logic circuitry commonly referred to as a "snoop controller" configured to monitor the system bus for the snoopable addresses requested by a different processor or other bus agent. Snoopable addresses may refer to the addresses requested by the other processor or bus agent that are to be snooped by snoop controllers on the system bus. Snoop controllers may snoop these snoopable addresses to determine if copies of the snoopable addresses requested by the other processor or bus agent are within their associated cache memories using a protocol commonly referred to as Modified, Exclusive, Shared and Invalid (MESI). In the MESI protocol, an indication of a coherency state is stored in association with each unit of storage in the cache memory. This unit of storage may commonly be referred to as a "coherency granule". A "cache line" may be the size of one or more coherency granules. In the MESI protocol, the indication of the coherency state for each coherency granule in the cache memory may be stored in a cache state directory in the cache subsystem. Each coherency granule may have one of four coherency states: modified (M), exclusive (E), shared (S), or invalid (I), which may be indicated by two or more bits in the cache state directory. The modified state indicates that a coherency granule is valid only in the cache memory containing the modified or updated coherency granule and that the value of the updated coherency granule has not been written to system memory. When a coherency granule is indicated as exclusive, the coherency granule is resident in only the cache memory having the coherency granule in the exclusive state. However, the data in the exclusive state is consistent with system memory. If a coherency granule is marked as shared, the coherency granule is resident in the associated cache memory and may be in one or more cache memories in addition to the system memory. If the coherency granule is marked as shared, all of the copies of the coherency granule in all the cache memories so marked are consistent with the system memory. Finally, the invalid state may indicate that the data and the address tag associated with the coherency granule are both invalid and thus are not contained within that cache memory.

To determine whether a "cache hit" or a "cache miss" occurred from an address requested by the processor or whether a copy of a snoopable address requested by another processor or bus agent is within the cache memory, there may be logic in the cache to search what is referred to as a "cache directory". The cache directory may be searched using a portion of the bits in the snoopable address or the address requested by the processor. The cache directory, as mentioned above, stores the coherency state for each coherency granule in the cache memory. The cache directory also stores a unique tag used to indicate whether data from a particular address is stored in the cache memory. This unique tag may be compared with particular bits from the snoopable address and the address requested by the processor. If there is a match, then the data contained at the requested address lies within the cache memory. Hence, the cache directory may be searched to determine if the data contained at the requested or snoopable address lies within the cache memory.

An example of a processor associated with multiple levels of caches incorporating the above-mentioned concepts is described below in association with FIG. 1. Referring to FIG. 1, FIG. 1 illustrates a processor 101 coupled to an L2 cache 102 which is coupled to an L3 cache 103. Processor 101, L2 cache 102 and L3 cache 103 may be implemented on an integrated circuit 104. L3 cache 103 may include a multiplexer 105 configured to receive requests from processor 101, such as a read or write request described above, as well as the snoopable address via an interconnect 106. Interconnect 106 is connected to a system bus (not shown) which is connected to other processors (not shown) or bus agents (not shown). An arbitration mechanism 107 may determine which of the two requests (requests from interconnect 106 and from processor 101) gets serviced. The selected request is dispatched into a dispatch pipeline 108. If the snoop request is not selected, it may be sent on a bypass pipeline 113. Bypass pipeline 113 may be configured to indicate to interconnect 106 to retry resending the snoop request that was denied.

Dispatch pipeline 108 is coupled to a cache directory 109. Dispatch pipeline 108 may contain logic configured to determine if the data at the requested address lies within a cache memory 114 of L3 cache 103. Dispatch pipeline 108 may determine if the data at the requested address lies within cache memory 114 by comparing the tag values in cache directory 109 with the value stored in particular bits in the requested address. As mentioned above, if there is match, then the data contained at the requested address lies within cache memory 114. Otherwise, cache memory 114 does not store the data at the requested address. The result may be transmitted to response pipeline 110 configured to transmit an indication as to whether the data at the requested address lies within cache memory 114. The result may be transmitted to either processor 101 or to another processor (not shown) or bus agent (not shown) via interconnect 106.

Referring to FIG. 1, response pipeline 110 and bypass pipeline 113 may be coupled to a multiplexer 115. Multiplexer 115 may be configured to select to send either the result from response pipeline 110 or the request to retry resending the snoop request denied from bypass pipeline 113 by using particular bit values from arbiter 107. That is, arbiter 107 may be configured to send particular bit values to the select input of multiplexer 115 used to select either the result from response pipeline 110 or the request to retry resending the snoop request denied from bypass pipeline 113.

Referring again to FIG. 1, dispatch pipeline 108 may further be configured to dispatch the result, e.g., cache hit, to processor's 101 requests to read/write machines 112A-N, where N is any number. Read/write machines 112A-N may collectively or individually be referred to as read/write machines 112 or read/write machine 112, respectively. Read/write machines 112 may be configured to execute these requests, e.g., read request, for processor 101.

Dispatch pipeline 108 may further be configured to dispatch the result to requests from interconnect 106 to snooping logic, referred to herein as "snoop machines" 111A-N, where N is any number. Snoop machines 111A-N may collectively or individually be referred to as snoop machines 111 or snoop machine 111, respectively. Snoop machines 111 may be configured to respond to the requests from other processors or bus agents. Snoop machines 111 may further be configured to write modified data in the cache memory of L3 cache 103 to the system memory (not shown) to maintain cache coherency.

Referring to FIG. 1, interconnect 106 may transfer a received snoop request to multiplexer 105 every cycle. The response to the snoop request may be transmitted at a given fixed number of cycles after interconnect 106 transmits the snoop request to L3 cache 103. For example, interconnect 106 may transmit the snoop request to multiplexer 105 on a given cycle followed by a determination by arbiter 107 as to whether the snoop request is selected to be dispatched to dispatch pipeline 108 or is to be transmitted on bypass pipeline 113 to response pipeline 110. If the snoop request is selected, it enters dispatch pipeline 108 and response pipeline 110 some cycle(s) later. A search in cache directory 109 is made some cycle(s) later by dispatch pipeline 108. The result as to whether data at the snoop address lies within cache memory 114 is transmitted to response pipeline 110. The response may be generated and transmitted to interconnect 106 some cycle(s) later by response pipeline 110. All these actions occur on a fixed schedule as illustrated in FIG. 2.

FIG. 2 is a timing diagram illustrating the actions described above occurring on a fixed schedule. Referring to FIG. 2, in conjunction with FIG. 1, interconnect 106 sends snoop requests A, B, C, and D to multiplexer 105 during the indicated clock cycles. Processor 101 (labeled "processor" in FIG. 2) sends requests M and N to multiplexer 105 during the indicated clock cycles. As illustrated in FIG. 2, snoop requests B and C are transmitted during the same cycle as requests M and N. The request (either the snoop request or the request sent by processor 101) becomes selected and dispatched by arbiter 107 to dispatch pipeline 108 (labeled "dispatch pipeline" in FIG. 2). As illustrated in FIG. 2, arbiter 107 selects snoop request A followed by selecting requests M and N instead of snoop requests B and C, respectively, followed by selecting snoop request D. These selected requests are dispatched to dispatch pipeline 110 in the clock cycles indicated in FIG. 2.

FIG. 2 further illustrates which clock cycle the result as to whether data at the addresses requested by snoop requests A and D was found within cache memory 114 is inputted to response pipeline 110. Snoop requests B and C are inputted into bypass pipeline 113 (indicated by "bypass pipeline" in FIG. 2) at the illustrated clock cycle since they were not selected by arbiter 107. At the end of response pipeline 110 for snoop request A (corresponds to the time to respond to snoop request A as labeled in FIG. 2), the result is transmitted to interconnect 106 at that given cycle. At the end of bypass pipeline 113 for snoop request B (corresponds to the time to respond to snoop request B as labeled in FIG. 2), the result (request to retry resending snoop request B) is transmitted to interconnect 106 at the cycle following the transmission of the result for snoop request A and so forth. As illustrated in FIG. 2, the time to respond to each snoop request occurs on a fixed schedule.

As stated above, if the snoop request is not selected by arbiter 107 (arbiter 107 selected request from processor 101 instead of snoop request), then the snoop request, e.g., snoop requests B and C, is sent to bypass pipeline 113 some cycle(s) later. The response indicating to retry sending the snoop request is generated and transmitted to interconnect 106 at a given cycle by bypass pipeline 113, some cycles later. Consequently, a snoop request from interconnect 106 may have to be denied and requested to be retried again which may result in hundreds of additional clock cycles of delay. If the number of rejected snoop requests could be reduced, then the performance could be improved.

Therefore, there is a need in the art to improve the performance by reducing the number of snoop requests denied.

SUMMARY

The problems outlined above may at least in part be solved in some embodiments by extending the time to respond to the snoop requests. The time to respond to snoop requests may be extended by "n" clock cycles. These "n" cycles may be used to provide additional time to resend the snoop request to be accepted by the arbitration mechanism upon denial of the snoop request by the arbitration mechanism. By providing the snoop request additional opportunities to be accepted by the arbitration mechanism, fewer snoop requests may ultimately be denied thereby improving the performance.

In one embodiment of the present invention, a method for reducing the number of snoop requests rejected may comprise the step of receiving a new snoop request. The method may further comprise entering the snoop request in a first available latch in a pipeline of latches in a first unit if the first unit is not full. The method may further comprise dispatching the new snoop request upon entering a bottom latch in the pipeline in the first unit. The method may further comprise storing a copy of the new snoop request in a top latch of an overrun pipeline of latches in the first unit upon dispatching the new snoop request. An indication as to whether the new snoop request was accepted or rejected by an arbitration mechanism is received upon the copy of the new snoop request reaching a bottom latch in the overrun pipeline in the first unit.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 3:
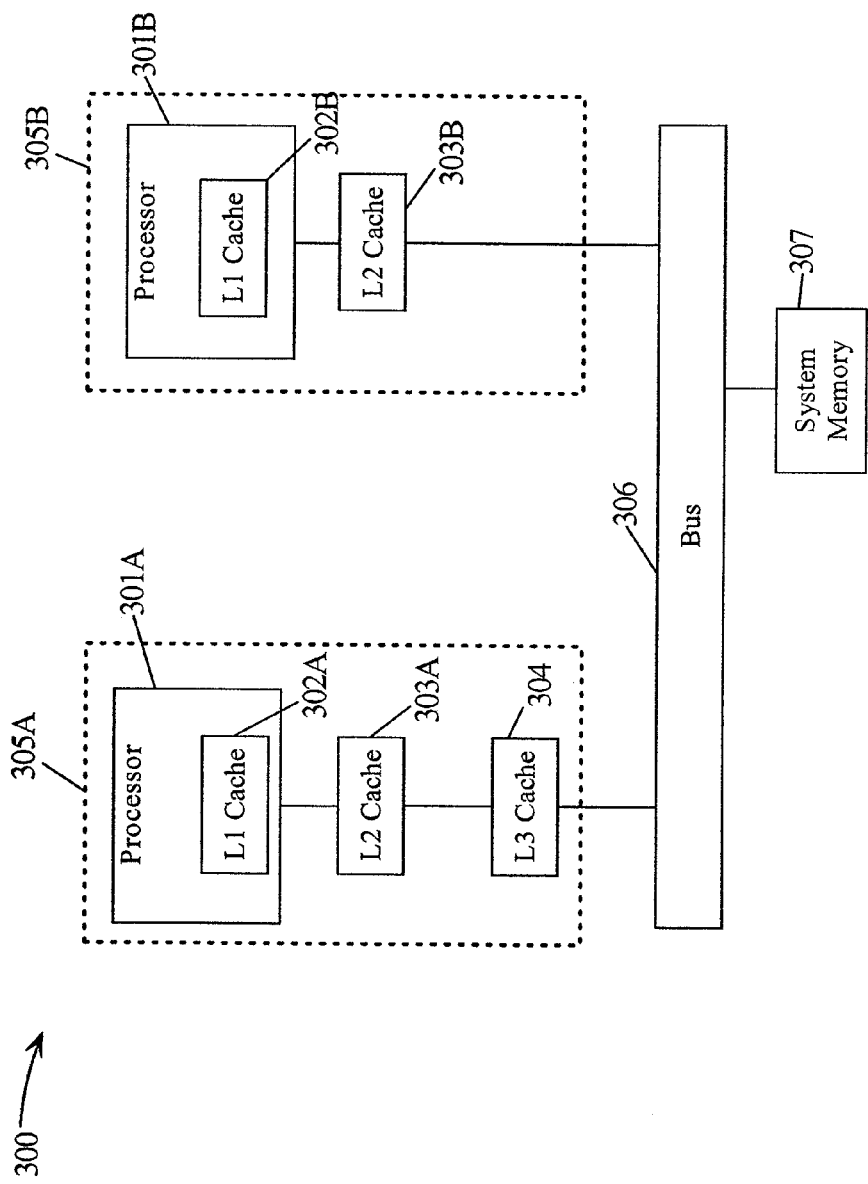
FIG. 3 illustrates a multiprocessor system configured in accordance with an embodiment of the present invention.

FIG. 3—Multiprocessor System

FIG. 3 illustrates an embodiment of the present invention of a multiprocessor system 300. System 300 may include one or more processors 301A-B. Processors 301A-B may collectively or individually be referred to as processors 301 or processor 301, respectively. Processors 301A-B may each include a level one (L1) cache 302A-B, e.g., L1 instruction/data cache, respectively. L1 caches 302A-B may be configured to store instruction and data values that may be repeatedly accessed by processors 301A-B, respectively. L1 caches 302A-B may collectively or individually be referred to as L1 caches 302 or L1 cache 302, respectively. It is noted that those skilled in the art will recognize that multiple L1 caches, e.g., L1 instruction cache, L1 data cache, may be implemented instead of a unified L1 cache.

In order to minimize data access latency, one or more additional levels of cache coupled to processors 301 may be implemented such as a level two (L2) cache 303A-B coupled to processors 301A-B, respectively. L2 caches 303A-B may collectively or individually be referred to as L2 caches 303 or L2 cache 303, respectively. Furthermore, FIG. 3 illustrates a level three (L3) cache 304 coupled to L2 cache 303A. The lower cache levels may be employed to stage data to an L1 cache 302 and typically have progressively larger storage capacities but longer access latencies. It is noted that processors 301 may each be coupled to any number of additional levels of cache. It is further noted that in one embodiment, each processor 301A-B and associated lower cache levels may reside on a single intergraded circuit 305A-B, respectively.

Referring to FIG. 3, each processor 301 may be coupled to a bus 306. Bus 306 may subsequently permit the transmit of information, e.g., addresses, data, between processors 301 and a system memory 307. It is noted that system 300 may include any number of processors 301 coupled to system memory 307 via bus 306. It is further noted that FIG. 3 is not to be limited in scope to any particular embodiment and that FIG. 3 is illustrative.

Referring to FIG. 3, processor 301 may generate a transfer request to be received by bus 306. A "transfer request" may refer to either a request to read an address not within its associated cache memory(ies) or a request to write to an address not exclusively owned by its associated cache memory(ies).

Bus 306 may contain logic configured to determine if the received transfer request is snoopable ("snoopable transfer request"). That is, bus 306 may contain logic configured to determine if the received transfer request is to be broadcasted to the other snoop controllers (not shown) not associated with processor 301 that generated the transfer request. The other snoop controllers (not shown) may be configured to determine if a copy of the requested snoopable address, i.e., a copy of the requested coherency granule(s), is within their associated cache memories. The broadcasted transfer request may commonly be referred to as a "snoop request."

As stated in the Background Information section, a snoop request from an interconnect of a cache may have to be denied and requested to be retried again which may result in hundreds of additional clock cycles of delay. If the number of rejected snoop requests could be reduced, then the performance could be improved. Therefore, there is a need in the art to improve the performance by reducing the number of snoop requests denied.

Figure 4:
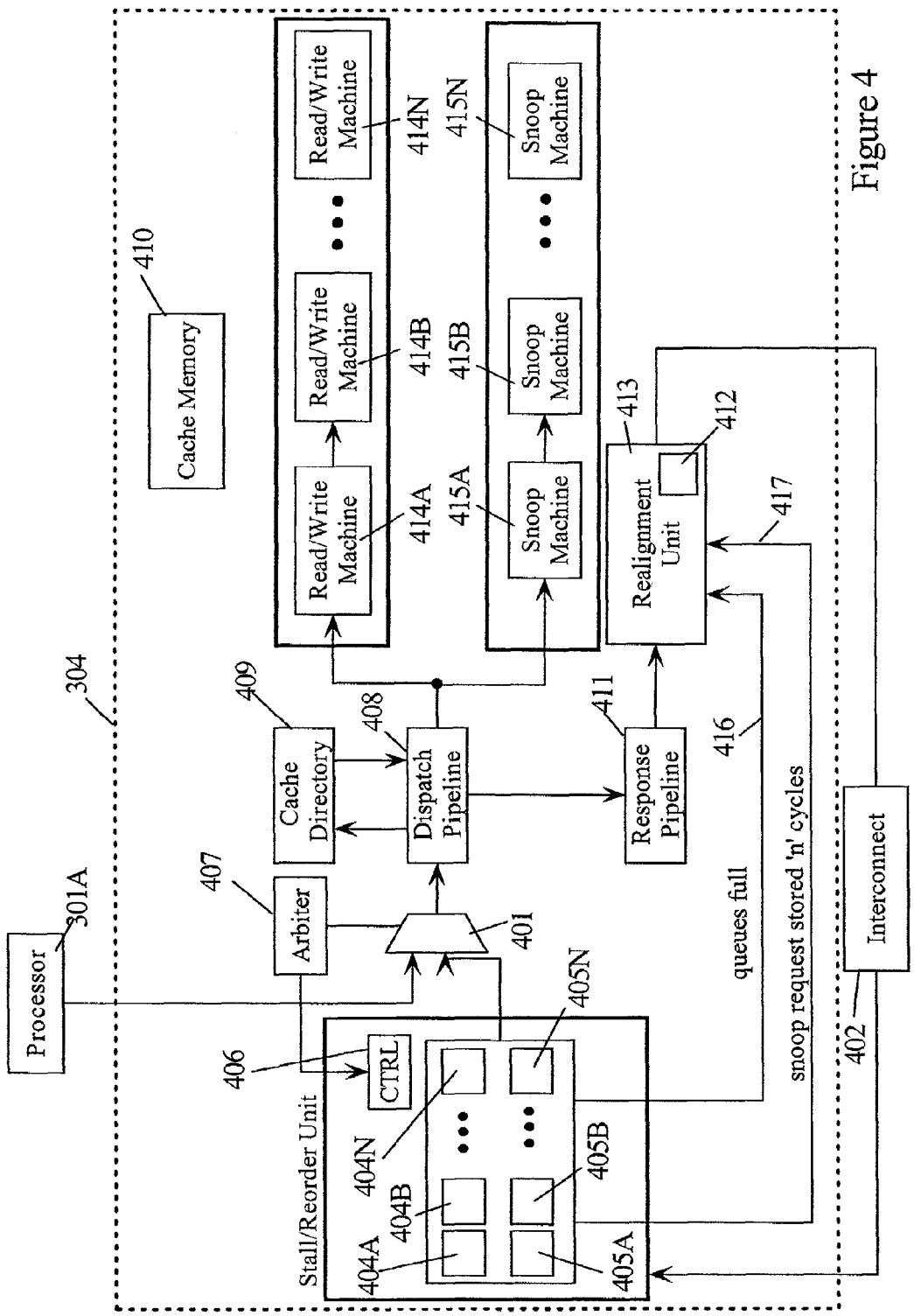
FIG. 4 illustrates a cache, such as an L3 cache, incorporated with a mechanism to reduce the number of snoop requests that get rejected in accordance with an embodiment of the present invention.
Figure 5:
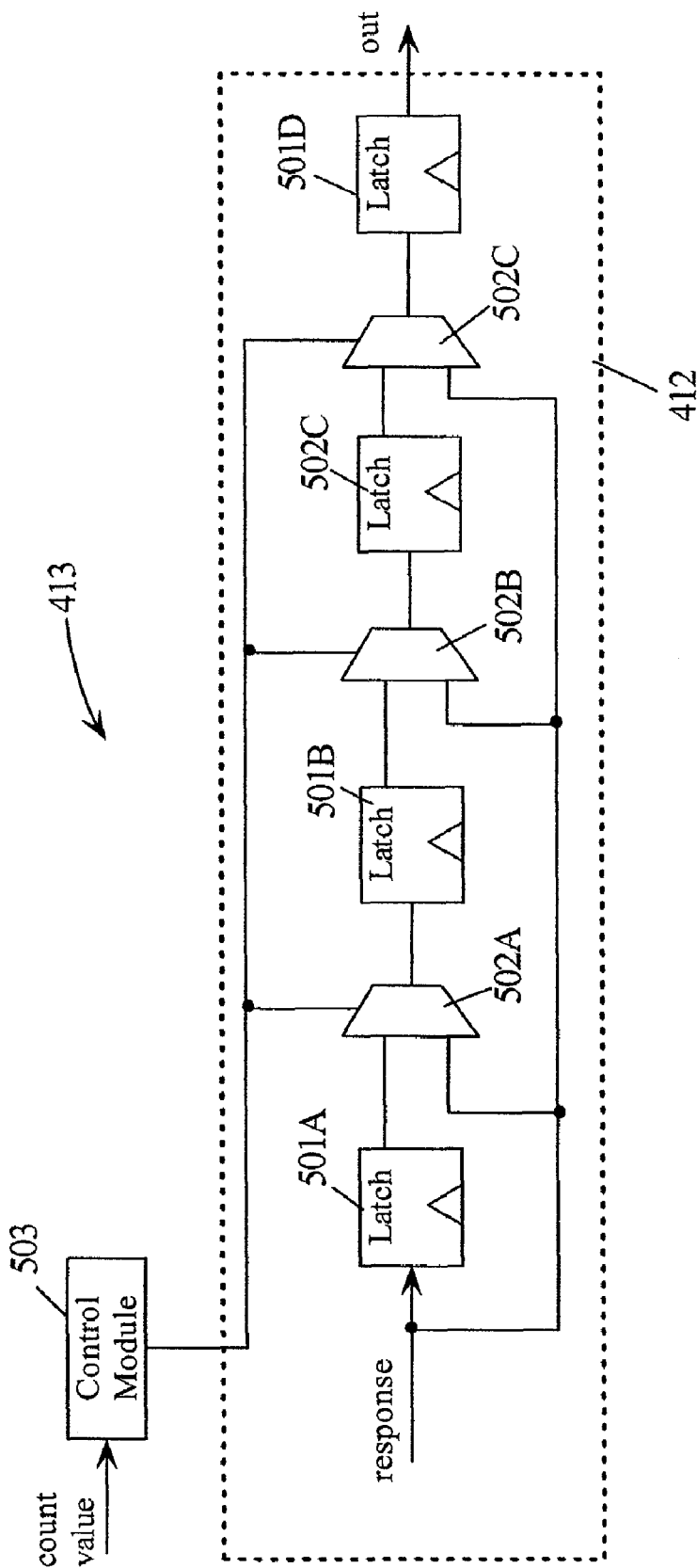
FIG. 5 illustrates an embodiment of the present invention of a realignment unit.
Figure 6A:
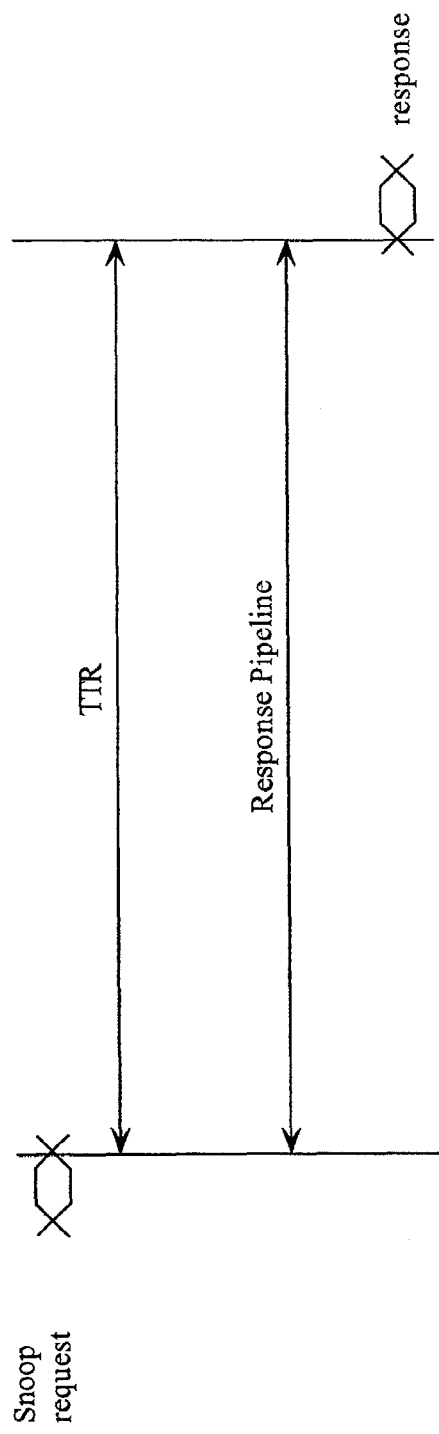
FIG. 6A is a timing diagram illustrating the time to respond to a snoop request using the mechanism of FIG. 1.
Figure 6B:
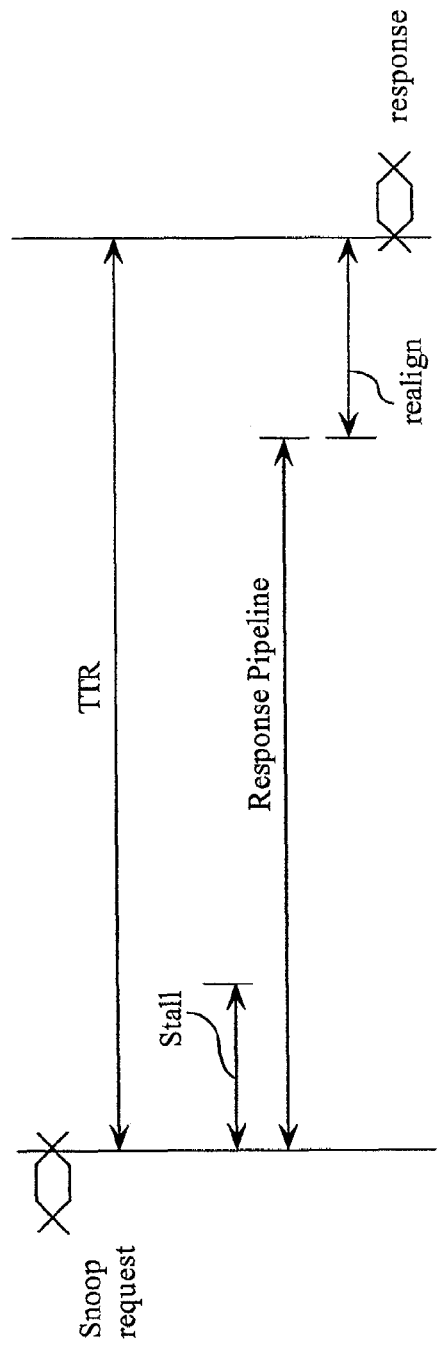
FIG. 6B is a timing diagram illustrating the time to respond to a snoop request using the mechanism of FIG. 4 in accordance with an embodiment of the present invention.

A mechanism for reducing the number of snoop requests that get rejected is described below in association with FIGS. 4, 5, 6A-B, 7 and 8A-B. FIG. 4 illustrates the mechanism for reducing the number of snoop requests that get rejected in L3 cache 304 in integrated circuit 305A. It is noted that the mechanism may be implemented in any cache and that the principles of the present invention described in FIG. 4 may be applied to any cache. FIG. 5 illustrates an embodiment of a realignment unit illustrating how the realignment unit calculates the number of clock cycles to store the result of the snoop request or the request to retry resending the snoop request. FIG. 6A illustrates the time to respond to a snoop request using the mechanism of FIG. 1. FIG. 6B illustrates extending the time to respond to the snoop request thereby reducing the number of snoop requests that get rejected.

Figure 7:
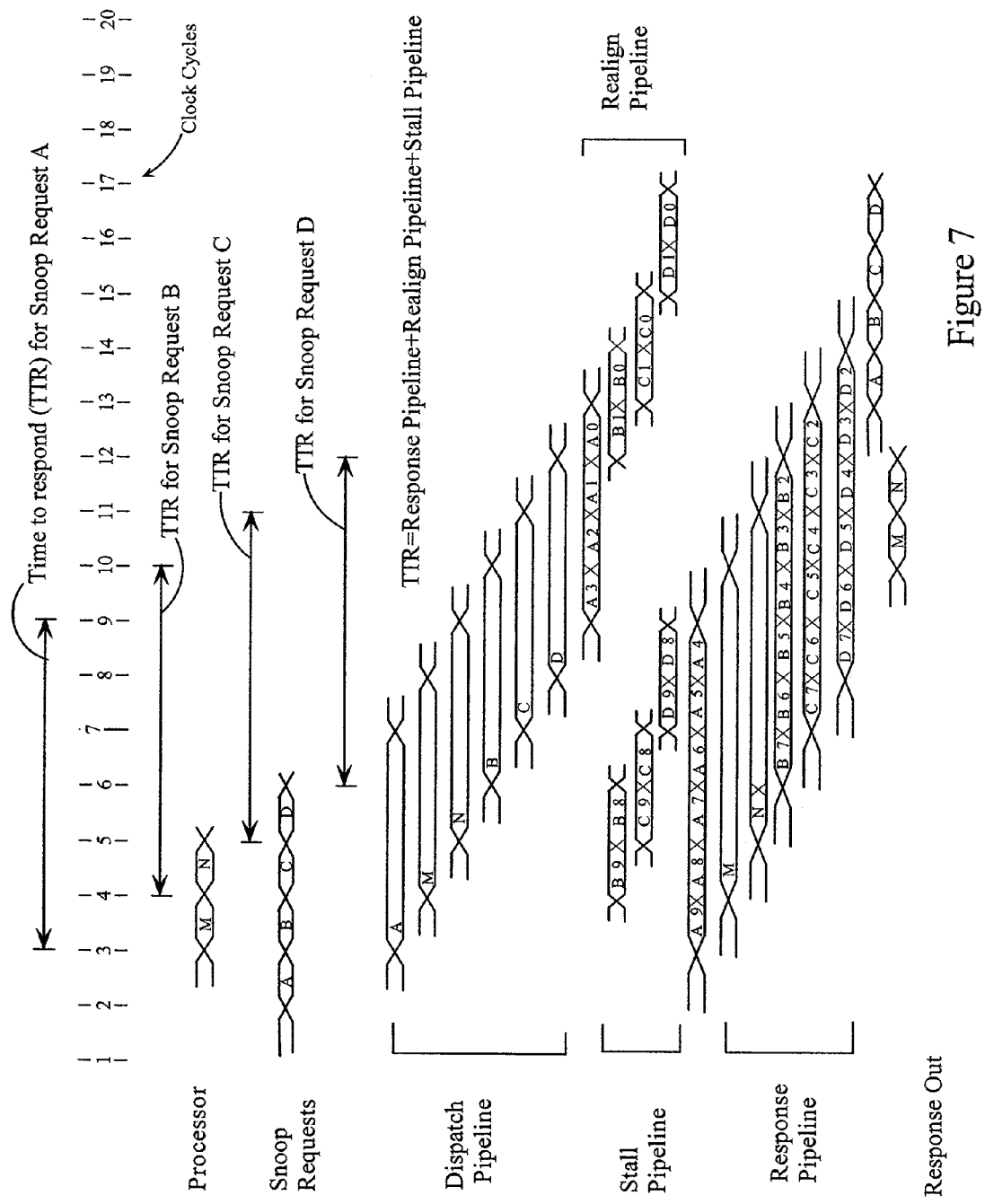
FIG. 7 is an illustration of expanding the time to respond to a snoop request using the mechanism of FIG. 4 in accordance with an embodiment of the present invention.
Figure 8A:
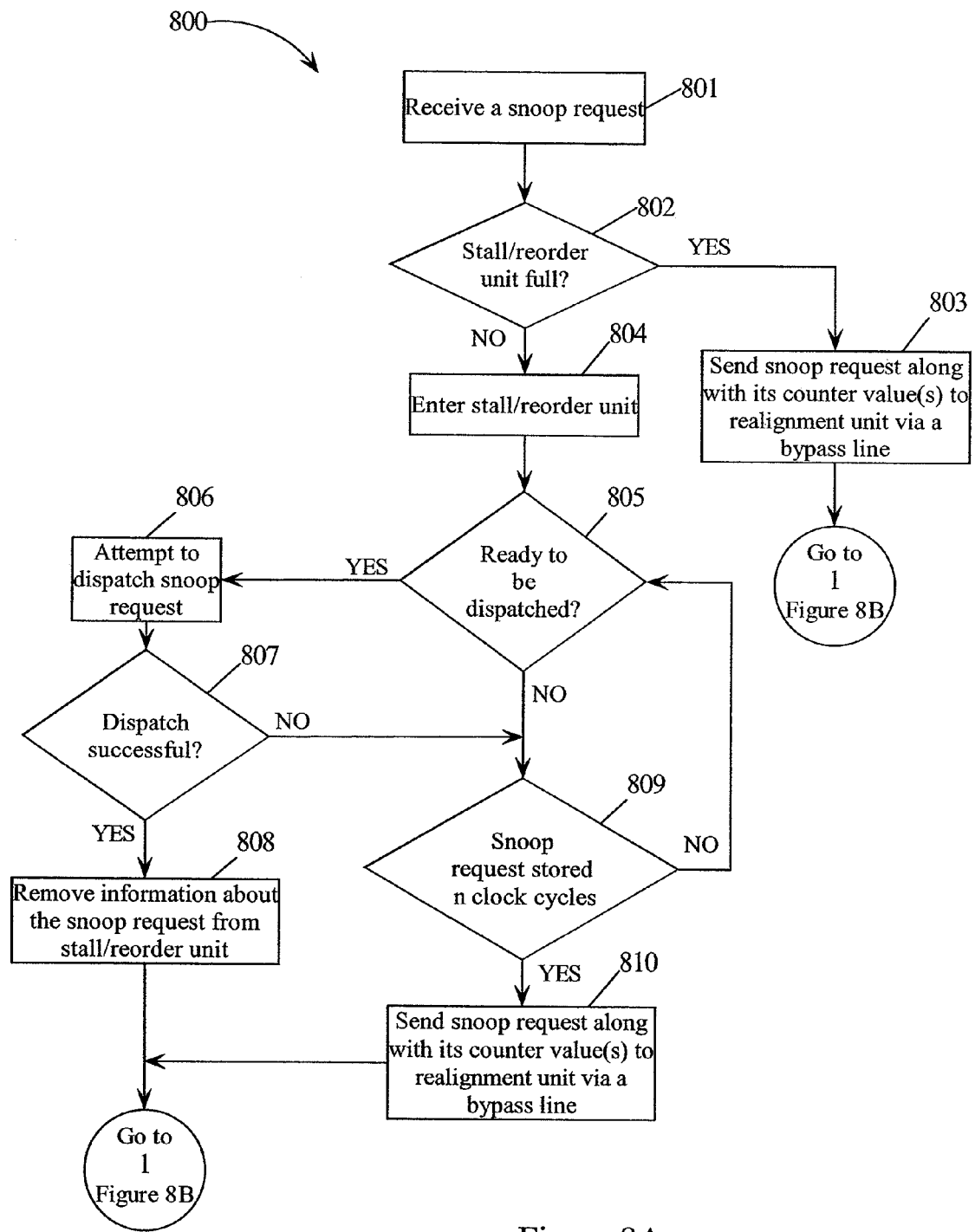
FIGS. 8A-B are a flowchart of a method for reducing the number of snoop requests that get rejected in accordance with an embodiment of the present invention.
Figure 8B:
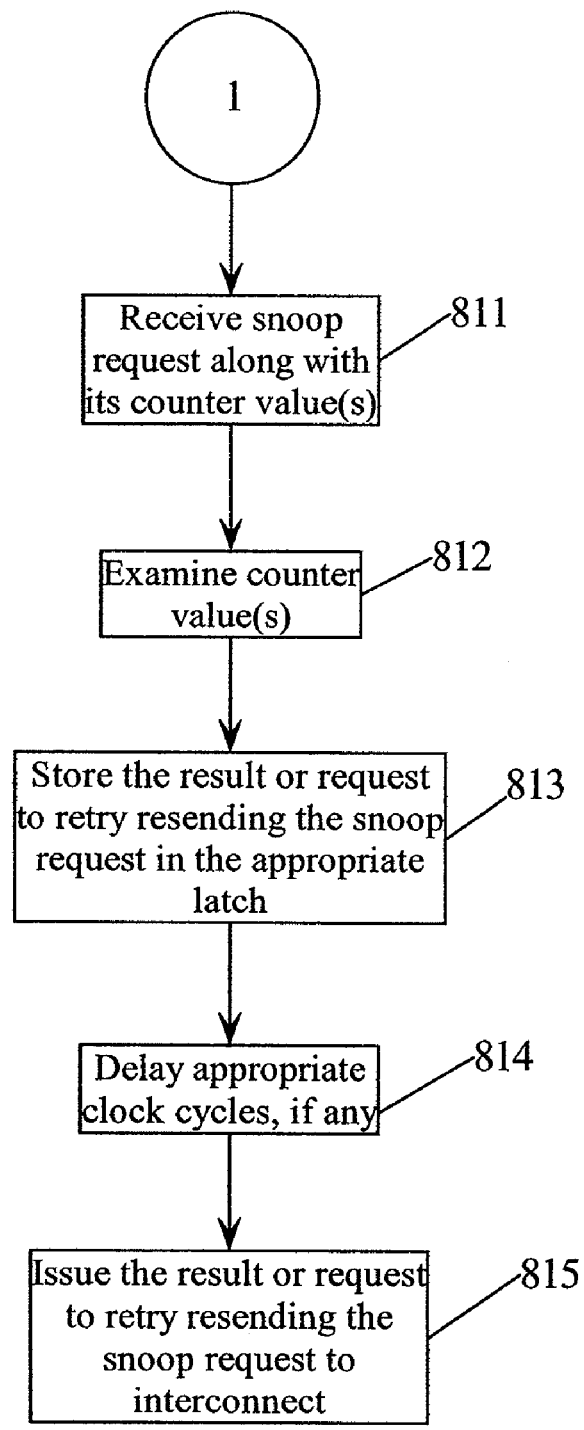

FIG. 7 is a timing diagram illustrating the extension of the time to respond to the snoop request. FIGS. 8A-B are a flowchart of a method for reducing the number of snoop requests that get rejected using the mechanism as described in FIG. 4.

FIG. 4—L3 Cache Incorporated with Mechanism to Reduce the Number of Snoop Requests that Get Rejected FIG. 4 illustrates an embodiment of the present invention of a L3 cache 304 (FIG. 3) that includes a mechanism for reducing the number of snoop requests that get rejected.

Referring to FIG. 4, L3 cache 304 includes a multiplexer 401 configured to receive a request from processor 301A as well as a snoop request received via an interconnect 402. The snoop request is received by multiplexer 401 via a unit, referred to herein as the "stall/reorder unit" 403. Stall/reorder unit 403 may be configured to store information, e.g., address, of the received snoop request for up to a maximum number of n clock cycles. By being able to store information about the snoop request for up to a maximum number of n clock cycles, the time to respond to a snoop request is expanded. By expanding the time to respond to a snoop request, there will be fewer snoop requests that get rejected as explained in further detail below.

Stall/reorder unit 403 may include a series of queues 404A-N, where N is any number. Queues 404A-N may collectively or individually be referred to as queues 404 or queue 404, respectively. Queues 404 may be configured to store information, e.g., address, about the snoop requests. Stall/reorder unit 403 may further include a series of latches 405A-N, where N is any number, storing a count of the number of clock cycles information about a particular snoop request has resided in stall/reorder unit 403. Latches 405A-N may collectively or individually be referred to as latches 405 or latch 405, respectively. Each latch 405, e.g., latch 405A, may store a count of the number of clock cycles information about a snoop request resides in an associated queue 404, e.g., queue 404A. Stall/reorder unit 403 may further includes a control unit 406 which will be described in more detail below.

Upon receiving a snoop request from interconnect 402, stall/reorder unit 403 forwards the snoop request to multiplexer 401. Arbiter 407 determines which of the two requests (requests from interconnect 402 and from processor 301A) gets serviced. The selection performed by arbiter 407 is communicated to control unit 406.

If arbiter 407 denies the snoop request, control unit 406 may be configured to maintain the information stored in queue 404 for that denied snoop request. Further, control unit 406 may be configured to increment the counter in the associated latch 405 thereby indicating that the information about the snoop request will continue to reside in queue 404. Control unit 406 may be further configured to determine if any of the counters counted "n" cycles indicating that the information about a snoop request in an associated queue 404 resided there for "n" clock cycles. As stated above, stall/reorder unit 403 may be configured to store the information about a snoop request up to a maximum number of n clock cycles. When a latch 405 indicates that a counter counted "n" clock cycles, the snoop request may be transmitted to a unit, referred to herein as the "realignment unit" 409, by stall/reorder unit 403 via bypass line 417. Further, stall/reorder unit 403 may transmit along with the snoop request the counter bit(s) indicated by the associated latch 405 to realignment unit 413 via bypass line 417.

Upon receiving a snoop request and associated counter bit(s) that indicate that the information about the snoop request resided in stall/reorder unit 403 for n clock cycles, realignment unit 413 transmits a response to interconnect 402 indicating to retry resending the snoop request.

Stall/reorder unit 403 may further be configured to transmit a snoop request received from interconnect 402 to realignment unit 413 over bypass line 416 if queues 404 are full and are not able to store information about the received snoop request. Along with the transmitted snoop request, an indication that zero clock cycles were counted by a counter(s) may be transmitted to realignment unit 413 over bypass line 416.

Upon receiving a snoop request and associated counter bit(s) that indicate that the information about the snoop request did not reside in stall/reorder unit 403 for any clock cycles, realignment unit 413 transmits a response to interconnect 402 indicating to retry resending the snoop request after n clock cycles has transpired as described in further detail below.

As stated above, when arbiter 407 denies selecting a snoop request, control unit 406 maintains the information stored in queue 404 for that snoop request. Further, control unit 406 may increment the counter in the associated latch 405 thereby indicating that the snoop request will have resided in queue 404 for an additional period of time. Upon being denied by arbiter 407, stall/reorder unit 403 may be configured to resend that snoop request to multiplexer 401 upon a later point in time.

If, on the other hand, arbiter 407 selects the snoop request, stall/reorder unit 403 may be configured to transmit to multiplexer 401 the counter bit(s) stored in latch 405 associated with the accepted snoop request that indicate the number of clock cycles, if any, that the information about the accepted snoop request had resided in stall/reorder unit 403. This information may be passed along with the accepted snoop request. Upon being accepted by arbiter 407, the selected snoop request may be sent to dispatch pipeline 408. Dispatch pipeline 408 is coupled to a cache directory 409. Dispatch pipeline 408 may contain logic configured to determine if the data at the address of the snoop request lies within a cache memory 410 of L3 cache 304. Dispatch pipeline 408 may determine if the data at the requested address lies within cache memory 410 by comparing the tag values in cache directory 409 with the value stored in particular bits in the requested address. If there is a match, then the data contained at the requested address lies within cache memory 410. Otherwise, cache memory 410 does not store the data at the requested address. The result may be transmitted by dispatch pipeline 408 to response pipeline 411 configured to transmit an indication as to whether the data at the requested address lies within cache memory 410. The result is transmitted to realignment unit 413.

Dispatch pipeline 408 may further be configured to dispatch the result, e.g., cache hit, to processor's 301A requests to read/write machines 414A-N, where N is any number. Read/write machines 414A-N may collectively or individually be referred to as read/write machines 414 or read/write machine 414, respectively. Read/write machines 414 may be configured to execute these requests, e.g., read request, for processor 301A.

Dispatch pipeline 408 may further be configured to dispatch the result to requests from interconnect 402 to snooping logic, referred to herein as "snoop machines" 415A-N, where N is any number. Snoop machines 415A-N may collectively or individually be referred to as snoop machines 415 or snoop machine 415, respectively. Snoop machines 415 may be configured to respond to the requests from other processors or bus agents. Snoop machines 415 may further be configured to write modified data in the cache memory of L3 cache 304 to system memory 307 (FIG. 3) to maintain cache coherency.

As stated above, realignment unit 413 receives the counter bit(s) associated with the accepted snoop request that indicate the number of clock cycles, if any, that the information about the accepted snoop request had resided in stall/reorder unit 403. If the counter bit(s) indicate that the number of clock cycles is less than n clock cycles, then realignment unit 413 stores the result for the snoop request in a queue 412 for n clock cycles minus the number of clock cycles indicated by the counter bit(s). After waiting for n clock cycles minus the number of clock cycles indicated by the counter bit(s), realignment unit 413 transmits the result to interconnect 402. If, the counter bit(s) indicate n clock cycles, then realignment unit 413 transmits the result to interconnect 402 without storing the result in queue 412. By storing a snoop request denied by arbiter 407 for up to n cycles and storing the result to an accepted snoop request for n cycles minus the number of clock cycles the information about the snoop request was stored in stall/reorder unit 403, the time to respond has been extended by n clock cycles thereby providing additional time for a snoop request to be accepted instead of being rejected. That is, by extending the number of snoop requests that get serviced by the cache directory, the number of snoop requests that get rejected is reduced. An illustration of extending the time to respond to a snoop request is provided in FIGS. 6A-B. An embodiment of the present invention of realignment unit 413 illustrating how realignment unit 413 calculates the number of clock cycles to store the result for a snoop request or the request to retry resending the snoop request in queue 412 is provided below in association with FIG. 5.

Referring to FIG. 5, realignment unit 413 may include latches 501A-D. Latches 501A-D may collectively or individually be referred to as latches 501 or latch 501, respectively. It is noted that realignment unit 413 may include any number of latches 501 and that FIG. 5 is illustrative. Realignment unit 413 may further include multiplexers 502A-C coupled to latches 501A-C, respectively. Multiplexers 502A-C may collectively or individually be referred to as multiplexers 502 or multiplexer 502, respectively. It is noted that realignment unit 413 may include any number of multiplexers 502. The number of multiplexers 502 corresponds to "n" clock cycles as defined above. The number of latches 501 corresponds to one more than the number of multiplexers 502. Latches 501 and multiplexers 502 may form queue 412 of FIG. 4. Realignment unit 413 may further include a control module 503 coupled to the selector input of multiplexers 502A-C.

Referring to FIG. 5, in conjunction with FIG. 4, multiplexer 502A receives as input the output of latch 501A and the response (the result or request to retry resending the snoop request) to the snoop request. Similarly, multiplexer 502B receives as input the output of latch 501B and the response to the snoop request and multiplexer 502C receives as input the output of latch 501C and the response to the snoop request. Latch 501A receives as input the response to the snoop request and latch 501D receives the result that is to be transmitted to interconnect 402.

Control module 503 receives the count value transmitted from stall/reorder unit 403 as discussed above. Based on this value, control module 503 will select a particular multiplexer 502 to output the response (the result) to the snoop request. If there are anymore succeeding multiplexers 502, then those multiplexers 502 will output the result stored in the previous latch 501 the following clock cycle. For example, suppose the count value received by control module 503 indicated that the number of clock cycles that queue 404 has stored the information, e.g., address, for that snoop request, was zero. Control module 503 may then ensure that the result is stored in queue 412 (represented by latches 501A-D) for "n" clock cycles which in the example of FIG. 5 is three clock cycles. Consequently, control module 503 inputs a value to the selector of multiplexer 502A indicating to output the response (the result) from the snoop request. The response is later stored in latch 501B for a clock cycle. Control module 503 then inputs a value to the selector of multiplexer 502B indicating to output the response stored in latch 501B. That output is stored in latch 501C for a clock cycle. Control module 503 then inputs a value to the selector of multiplexer 502C indicating to output the response stored in latch 501C. That output is stored in latch 501D for a clock cycle followed by realignment unit 509 transmitting the result to interconnect 402.

Figure 1:
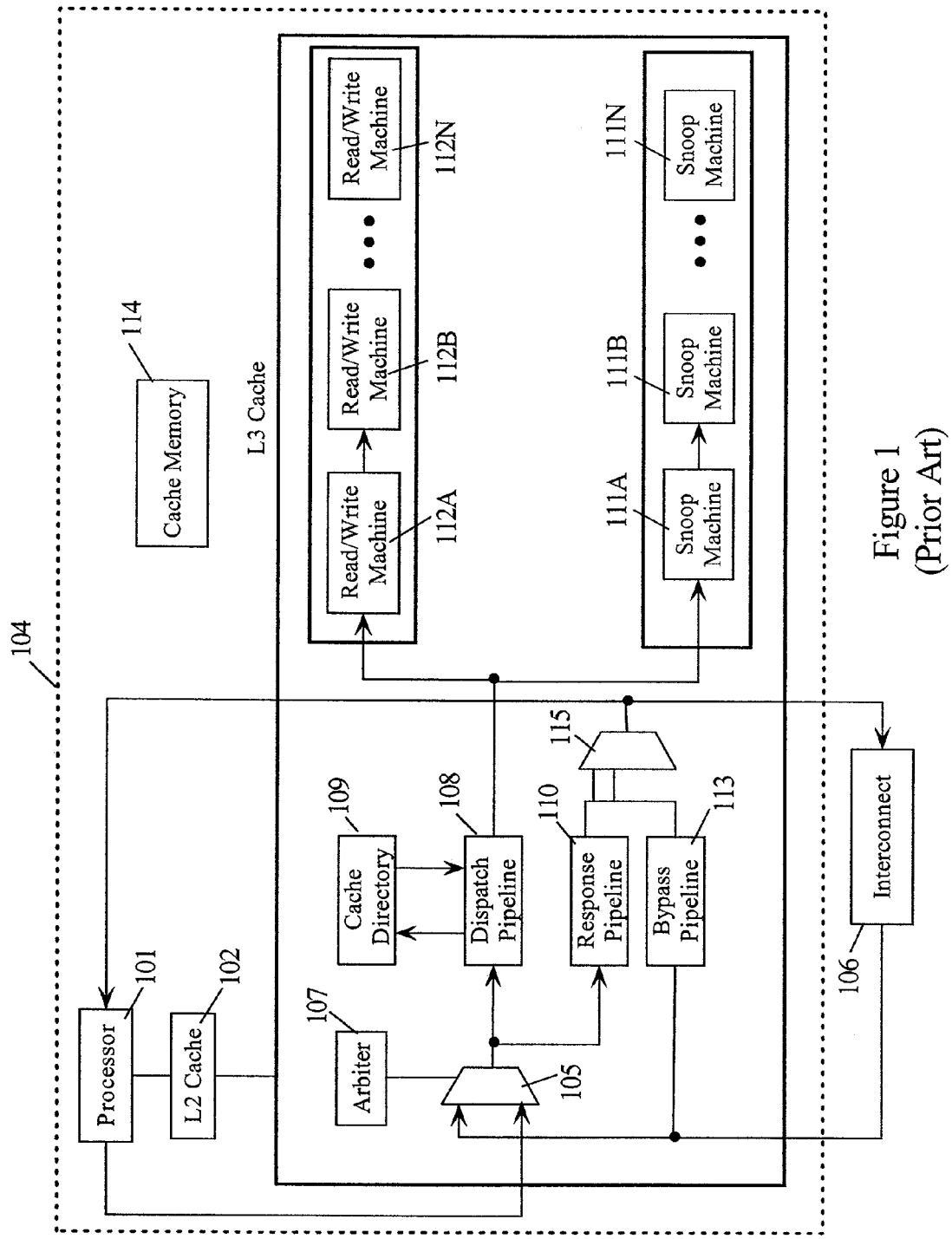
FIG. 1 illustrates internal components of a cache, such as an L3 cache.
Figure 2:
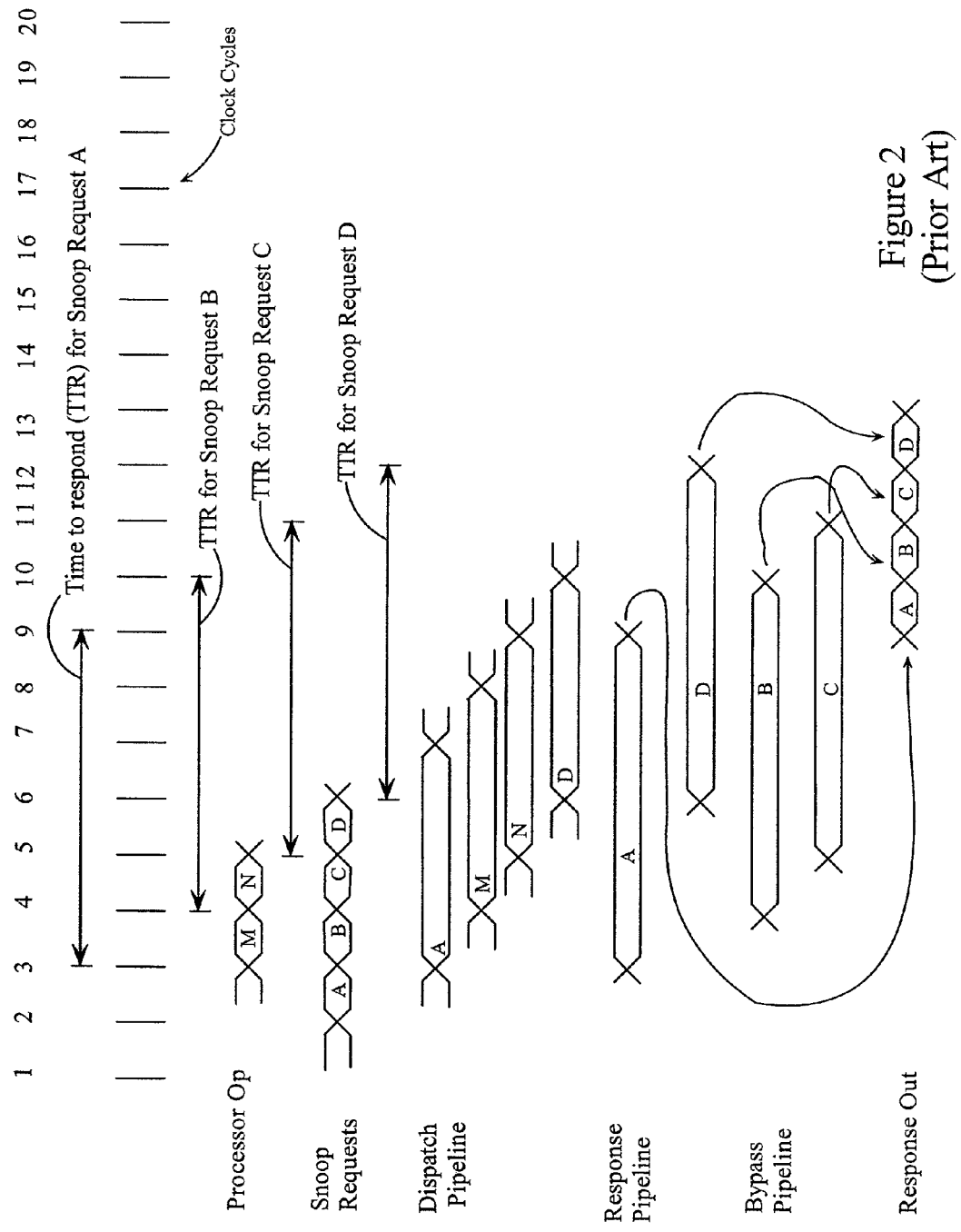
FIG. 2 is a timing diagram illustrating that the time to respond to a snoop request occurs on a fixed schedule.

Referring to FIG. 6A, FIG. 6A illustrates the time to respond (indicated by "TTR" in FIG. 6A) using the mechanism of FIG. 1. As illustrated in FIG. 6A, the response pipeline, such as response pipeline 110 of FIG. 1 and the TTR are the same. However, the TTR is expanded using the mechanism of FIG. 4 as illustrated in FIG. 6B.

FIG. 6B illustrates the time to respond (indicated by "TTR" in FIG. 6B) using the mechanism of FIG. 4. Referring to FIG. 6B, in conjunction with FIG. 4, the TTR includes the length of the response pipeline, such as response pipeline 411, plus the time durations labeled "stall" and "realign". The time duration of "stall" refers to the number of clock cycles, if any, that a snoop request resides in stall/reorder unit 403. That is, the time duration of "stall" refers to the number of clock cycles that the information, e.g., address, of a snoop request resides in queue 404 of stall/reorder unit 403. The time duration of "realign" refers to the number of clock cycles, if any, that the result to a snoop request resides in realignment unit 413. That is, the time duration of "realign" refers to the number of clock cycles that the result to a snoop request resides in queue 412 of realignment unit 413. It is noted that either the time duration of "stall" or "realign" may be a length of zero clock cycles. However, the total number of clock cycles of the "stall" and "realign" time periods equals "n" clock cycles.

Another illustration of expanding the TTR using the mechanism of FIG. 4 is illustrated in FIG. 7. FIG. 7 is a timing diagram illustrating the expansion of the time to respond to a snoop request using the mechanism of FIG. 4 in accordance with an embodiment of the present invention. Referring to FIG. 7, in conjunction with FIG. 4, interconnect 402 sends snoop requests A, B, C and D to stall/reorder unit 403 during the indicated clock cycles. Processor 301A (labeled "processor" in FIG. 7) sends requests M and N to multiplexer 401 during the indicated clock cycles. As illustrated in FIG. 7, snoop requests B and C are transmitted during the same clock cycle as requests M and N. As further illustrated in FIG. 7, requests A, M and N are initially selected by arbiter 407 and requests B, C and D are initially denied by arbiter 407. The selected requests are dispatched by arbiter 407 to dispatch pipeline 408 (labeled "dispatch pipeline" in FIG. 7) in the indicated clock cycles. The response these requests are later inputted to response pipeline 411 (labeled "response pipeline" in FIG. 7). For ease of understanding, FIG. 7 includes a count value following the label of the snoop request, e.g., A, B, C, D, indicating the number of clock cycles until the scheduled time to transmit the response to interconnect 402. For example, FIG. 7 illustrates that the time to respond to a snoop request is ten clock cycles. Hence, each snoop request includes a count value indicating the number of clock cycles (ranging from zero to nine) until the scheduled time to transmit the response to interconnect 402. It is noted that the time to respond may be any number of clock cycles and that FIG. 7 is illustrative.

As stated above, snoop request A was immediately accepted by arbiter 407. The response (result as to whether data at the address of snoop request A lies within cache memory 410) to snoop request A is later inputted to response pipeline 411 in the clock cycle indicated in FIG. 7. As illustrated in FIG. 7, the time to respond to a snoop request is ten clock cycles. Hence, since snoop request A was never denied by arbiter 407, the stall period as discussed above was zero clock cycles. Consequently, the result to snoop request A is stored in queue 412 of realignment unit 413 for the number of clock cycles that the time to respond was extended as described above. In the example illustrated in FIG. 7, the length of response pipeline 411 is six clock cycles. Since in the example illustrated in FIG. 7, the time to respond to a snoop request is ten clock cycles, the result to the snoop request is stored in queue 412 of realignment unit 413 for four clock cycles. These four clock cycles occur during the realign period (labeled "realign pipeline" in FIG. 7). At the end of the time to respond, the result is transmitted to interconnect 402 in the indicated clock cycle.

Similarly, as illustrated in FIG. 7, processor requests M and N were immediately accepted by arbiter 407. These requests were dispatched to dispatch pipeline 408 in the indicated clock cycle and the response to requests M and N were later inputted to response pipeline 411 (labeled "response pipeline" in FIG. 7). At the end of the response pipeline, these results are transmitted to processor 301A.

As stated above, when arbiter 407 denies selecting a snoop request, control unit 406 maintains the information stored in queue 404 for that snoop request for another clock cycle. The snoop request is retried the next clock cycle. The process is repeated until arbiter 407 selects the snoop request or until "n" clock cycles has been counted by the counter(s) for the duration of time that queue 404 has stored the information, e.g., address, for that snoop request. As illustrated in FIG. 7, there were two clock cycles in which the information for snoop request B was stored in queue 404 corresponding to the two times that snoop request B was denied by arbiter 407 (indicated by retrying snoop request B for two clock cycles). These two clock cycles occur during the stall period (labeled "stall pipeline" in FIG. 7). Similarly, snoop request C was stored in queue 404 for two clock cycles during the stall period as illustrated in FIG. 7. Similarly, snoop request D was denied for two clock cycles and hence was stored in queue 404 for two clock cycles during the stall period as illustrated in FIG. 7.

Once these previously denied snoop requests B, C and D are accepted by arbiter 407, snoop requests B, C and D are dispatched to dispatch pipeline 408 in the clock cycle indicated in FIG. 7. The responses (result as to whether data at the addresses of snoop requests B, C and D lie within cache memory 410) to snoop requests B, C and D are later inputted to response pipeline 411. At the end of the response pipeline, the results to snoop requests B, C and D are inputted to realignment unit 413 and stored in queue 412 for n cycles minus the number of clock cycles indicated by the counter bit(s) received by stall/reorder unit 403. That is, the result to snoop requests B, C and D are stored in queue 412 for the length of the realign period. FIG. 7 illustrates that the realign period for each of these requests is two clock cycles in length. At the end of the realign period for these requests, which may be zero clock cycles, the result is transmitted to interconnect 402 by realignment unit 413 as illustrated in FIG. 7.

In the example for snoop request A, as illustrated in FIG. 7, the realign period is four clock cycles and the stall period is zero clock cycles and hence "n" clock cycles (total number of clock cycles in addition to the response pipeline to formulate the total time to respond) corresponds to four clock cycles. Hence, the total time to respond to snoop request A is the length of the response pipeline plus four clock cycles (realign period plus the stall period) thereby extending the time to respond to a snoop request by four clock cycles over the mechanism of FIG. 1.

Similarly, in the example for snoop requests B, C and D, as illustrated in FIG. 7, the realign period is two clock cycles and the stall period is two clock cycles and hence "n" clock cycles (total number of clock cycles in addition to the response pipeline to formulate the total time to respond) corresponds to four clock cycles. Hence, the total time to respond to snoop requests B, C and D is the length of the response pipeline plus four clock cycles (realign period plus the stall period) thereby extending the time to respond to a snoop request by four clock cycles over the mechanism of FIG. 1.

By extending the time to respond to a snoop request, there is additional time for a snoop request to be accepted instead of being rejected. That is, by extending the number of snoop requests that get serviced by the cache directory, the number of snoop requests that get rejected is reduced.

A method for reducing the number of snoop requests that get rejected using the mechanism of FIG. 4 is described below in association with FIGS. 8A-B.

FIGS. 8A-B—Method for Reducing the Number of Snoop Requests that Get Rejected

FIGS. 8A-B are a flowchart of one embodiment of the present invention of a method 800 for reducing the number of snoop requests that get rejected.

Referring to FIG. 8A, in conjunction with FIGS. 3-5, 6A-B and 7, in step 801, stall/reorder unit 403 receives a snoop request from interconnect 402. In step 802, stall/reorder unit determines if queues 404 are full. If queues 404 are full, then, in step 803, stall/reorder unit 403 sends the snoop request along with its counter value(s) to realignment unit 413 via bypass line 416.

If, however, queues 404 are not full, then, in step 804, the snoop request enters stall/reorder unit 403. In step 805, stall/reorder unit 403 determines if the snoop request is ready to be dispatched to multiplexer 401.

If the snoop request is ready to be dispatched to multiplexer 401, then, in step 806, stall/reorder unit 403 attempts to dispatch the snoop request to multiplexer 401. In step 807, stall/reorder unit 403 determines if the dispatch of the snoop request was successful. If the dispatch was successful, then, in step 808, stall/reorder unit 403 removes the information, e.g., address, about the snoop request from queue 404.

If, however, the dispatch was not successful or if the snoop request was not ready to be dispatched, then, in step 809, stall/reorder unit 403 determines if the information, e.g., address, about the snoop request has been stored in queues 404 for "n" clock cycles.

If the information about the snoop request has not been stored in queues 404 for n clock cycles, then stall/reorder unit 403 determines if the snoop request is ready to be dispatched to multiplexer 401 in step 805.

If, however, the information about the snoop request has been stored in queues 404 for n clock cycles, then, in step 810, stall/reorder unit 403 transmits the snoop request along with its counter value(s) to realignment unit 413 via bypass line 417. In step 811, stall/reorder unit 403 removes the information, e.g., address, about the snoop request from queues 404.

FIG. 8B, as described below, describes the operations performed by realignment unit 413. Referring to FIG. 8B, in conjunction with FIGS. 3-5, 6A-B and 7, upon the snoop request being successfully dispatched to multiplexer 401 and accepted by arbiter 407, realignment unit 413 receives the result of the snoop request, along with its counter value(s), from response pipeline 411 in step 811. Further, realignment unit 413 receives the snoop request, along with its counter value(s) from stall/reorder unit 403 via bypass line 416, 417 in step 811.

In step 812, realignment unit 413 examines the received counter value(s) associated with the received snoop request. In step 813, realignment unit 413 stores the result or request to retry resending the snoop request in the appropriate latch 501. In step 814, the result or request to retry resending the snoop request is delayed the appropriate clock cycles ("the realignment period") by realignment unit 413. In step 815, realignment unit 413 issues the result or request to retry resending the snoop request to interconnect 402.

It is noted that method 800 may include other and/or additional steps that, for clarity and brevity, are not depicted. It is further noted that method 800 may be executed in a different order presented and that the order presented in the discussion of FIGS. 8A-B is illustrative. It is further noted that certain steps in method 800 may be executed in a substantially simultaneous manner.

A detail description of an embodiment of the present invention of stall/reorder unit 403 is provided below in association with FIG. 9.

Figure 9:
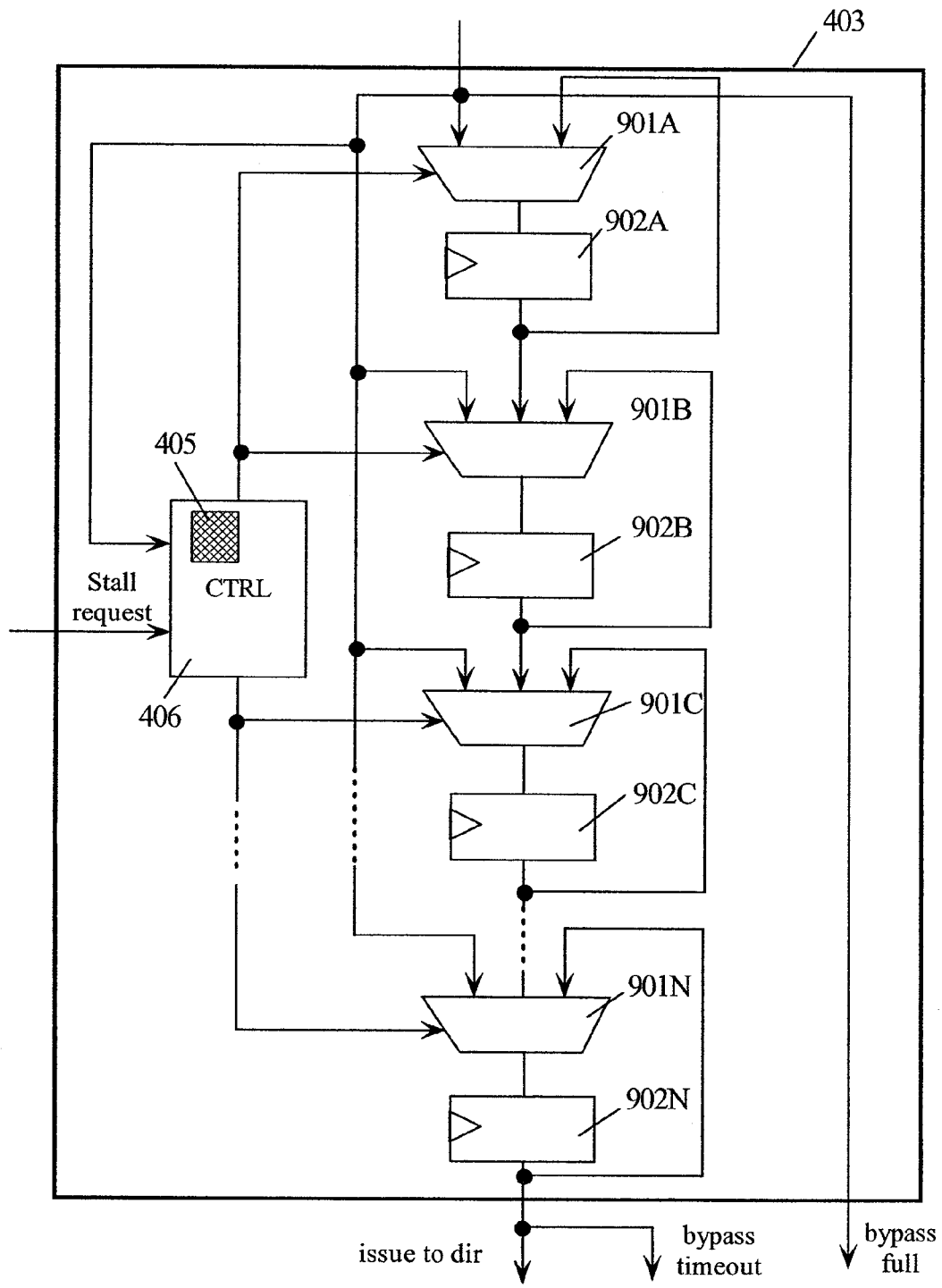
FIG. 9 is an embodiment of the present invention of stall/reorder unit.

FIG. 9—Embodiment of Stall/Reorder Unit

Referring to FIG. 9, stall/reorder unit 403 includes a plurality of multiplexers 901A-N, where N is any number. Multiplexers 901A-N may collectively or individually be referred to as multiplexers 901 or multiplexer 901, respectively. Stall/reorder unit 403 may further include a plurality of latches 902A-N coupled to multiplexers 901A-N. Latches 902A-N may collectively or individually be referred to as latches 902 or latch 902, respectively. Stall/reorder unit 403 may further include control unit 406 as described above. It is noted that stall/reorder unit 403 may include additional elements than depicted, but these additional elements were not depicted for ease of understanding.

The embodiment of stall/reorder unit 403 described in FIG. 9 is used under the condition of the snoop request having higher priority over a request from the processor. That is, when arbiter 407 (FIG. 4) receives a request from processor 301A (FIG. 4) and a snoop request from stall/reorder unit 403 (FIG. 4), arbiter selects the snoop request unless it receives an acknowledgment to select the request from processor 301A from control unit 406 as described below.

Referring to FIG. 9, in conjunction with FIG. 4, an incoming snoop request may be transmitted on bypass 416 when latches 902 are full and there is no shift operation, as described below, about to occur. If latches 902 are not full, then the incoming snoop request is inputted to multiplexers 901. Multiplexers 901 also receive as inputs the stored snoop request (address, type, etc. of snoop request) in the succeeding latch 902 and the stored snoop request in the preceding latch 902 except for multiplexer 901A.

As to which input of multiplexer 902 will be selected, control unit 406 issues a command to each multiplexer 902 to perform the following actions. Control unit 406 may issue a command to each multiplexer 902 to "shift-down". Shift down may refer to multiplexers 901 outputting the stored snoop request, if any, in the preceding latch 902 and the last latch 902 in the stack of latches 902 outputting the snoop request to either multiplexer 401 or to bypass line 417 based on whether the count value associated with the snoop request is n clock cycles. The count value associated with the snoop request may be determined by counters 405 as described above in FIG. 4. In one embodiment, counters 405 may reside in control unit 406

Control unit 406 may further issue a command to each multiplexer 902 to "hold." Hold may refer to multiplexers 901 outputting the snoop request stored in the succeeding latch 902.

Control unit 406 may further issue a command to a particular multiplexer 902 to output the incoming snoop request into the first available latch 902. The first available latch 902 may refer to the first latch 902 that does not store any information about a snoop request during a hold operation as described above. The first available latch 902 may also refer to latch 902 that does not store any information about a snoop request following a shift-down operation as described above.

As stated above, in this embodiment of stall/reorder unit 403, the snoop request has a higher priority than the request from processor 301A. Arbiter 407 may be configured to transmit a request, referred to herein as the "stall request", to control unit 406 to request to select the request from processor 301A. Upon receiving arbiter's 407 stall request, control unit 406 issues a command to implement the hold operation as described above.

The embodiment of stall/reorder unit 403 may be involved with either receiving snoop requests and outputting snoop requests at the same rate or receiving snoop requests at a faster rate than the rate at which snoop requests are outputted. Under the first scenario, the depth of the pipeline (multiplexers 901 and latches 902) described above may be able to handle the occasional selection of requests from processor 301A by arbiter 407 described above. Under the second scenario, the depth of the pipeline described above may be able to handle bursts of incoming snoop requests which arrive at a faster rate than the rate at which stall/reorder unit 403 outputs its snoop requests. Further, under the second scenario, the depth of the pipeline described above may be able to handle the occasional selection of requests from processor 301A by arbiter 407 described above.

The hold operation, as described above, may be implemented when arbiter 407 selects the request from processor 301A. The hold operation may further be implemented, under the second scenario described above, to transition to a slow clock cycle thereby allowing the snoop requests to be outputted by stall/reorder unit 403 at a lower rate.

The shift-down operation, as described above, may be implemented when the snoop request is dispatched to multiplexer 401 or when the snoop request (address, type, etc.) residing in the bottom latch 902, such as latch 902N, has a count value associated with it that is n clock cycles.

A flowchart detailing the operation of the embodiment of stall/reorder unit 403 described in FIG. 9 is described below in association with FIG. 10.

Figure 10:
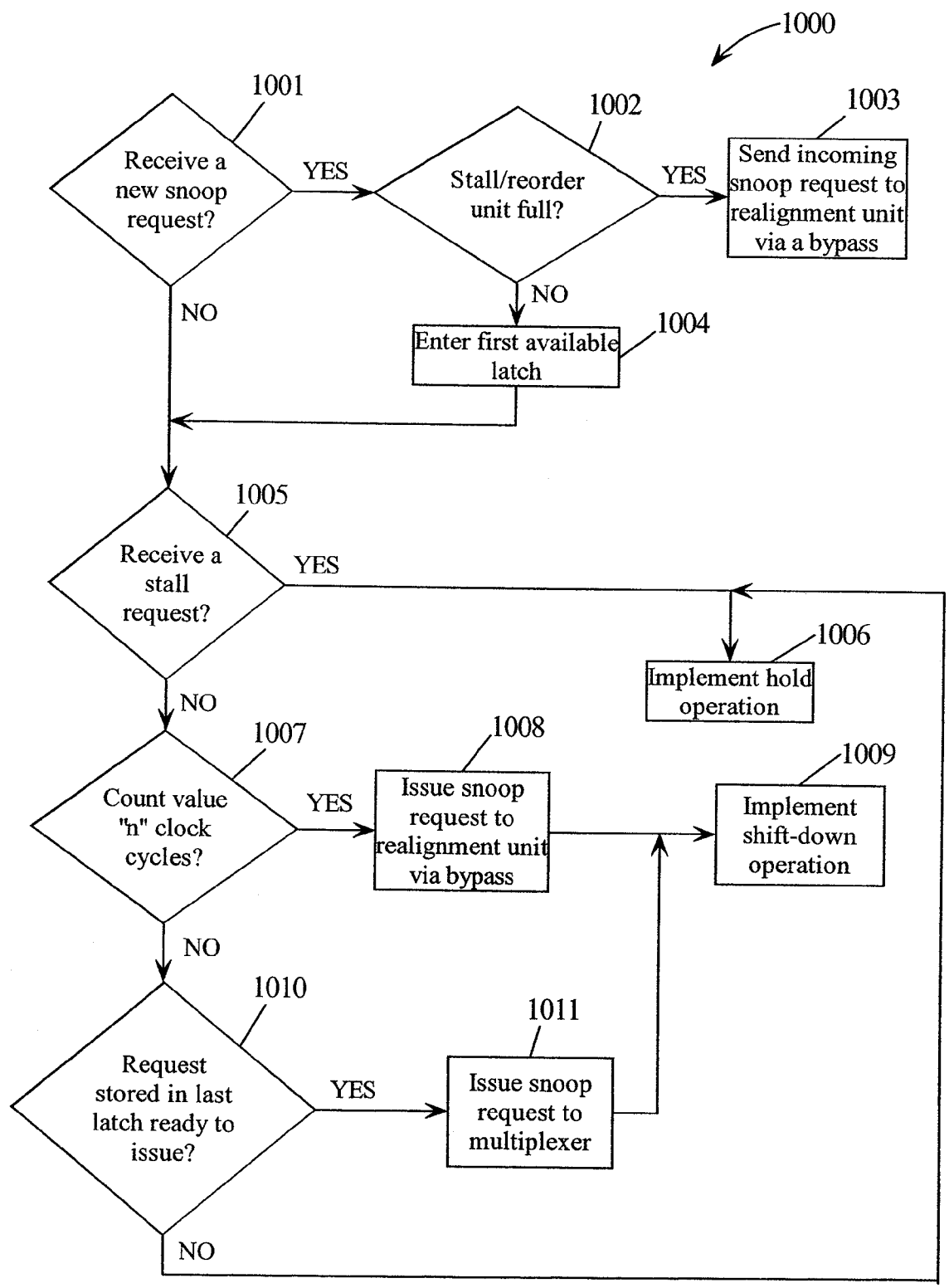
FIG. 10 is a flowchart of a method detailing the operation of the embodiment of stall/reorder unit described in FIG. 9 in accordance with an embodiment of the present invention.

FIG. 10—Method of Operation of Embodiment of Stall/Reorder Unit Described in FIG. 9

FIG. 10 is a method 1000 of operation of the embodiment of stall/reorder unit 403 (FIG. 4) described in FIG. 9.

Referring to FIG. 10, in conjunction with FIGS. 4 and 9, in step 1001, a determination is made by stall/reorder unit 403 as to whether it received a new snoop request. If stall/reorder unit 403 received a new snoop request, then, in step 1002, a determination is made by stall/reorder unit 403 as to whether stall/reorder unit 403 is full as described above.

If stall/reorder unit 403 is full, then stall/reorder unit 403 sends the incoming snoop request to realignment unit 413 via bypass 416 in step 1003. If, however, stall/reorder unit 403 is not full, then, in step 1004, the incoming snoop request enters the first available latch 902.

If stall/reorder unit 403 did not receive a new snoop operation or upon entering the incoming snoop request in the first available latch 902, then, in step 1005, a determination is made by control unit 406 as to whether it received a stall request from arbiter 407. If control unit 406 received a stall request from arbiter 407, then control unit 406 implements the hold operation as described above in step 1006.

If, however, control unit 406 did not receive a stall request from arbiter 407, then, in step 1007, control unit 406 determines if the snoop request stored in the last latch 902, e.g., latch 902N, has a count value associated with it that is "n" clock cycles. If the snoop request stored in the last latch 902, e.g., latch 902N, has a count value associated with it that is "n" clock cycles, then, in step 1008, control unit 406 sends the snoop request stored in the last latch 902 to realignment unit 413 via bypass 417. In step 1009, control unit 406 implements the shift-down operation as described above.

If, however, the snoop request stored in the last latch 902, e.g., latch 902N, has a count value associated with it that is "n" clock cycles, then, in step 1010, control unit 406 determines if that snoop request is ready to be issued to multiplexer 401. If that snoop request is not ready to be issued to multiplexer 401, then, in step 1006, control unit 406 implements the hold operation as described above.

If, however, the snoop request is ready to be issued to multiplexer 401, then, in step 1011, control unit 406 issues the snoop request to multiplexer 401. Upon issuing the snoop request to multiplexer 401, control unit 406 implements the shift-down operation as described above in step 1009.

It is noted that method 1000 may include other and/or additional steps that, for clarity and brevity, are not depicted. It is further noted that method 1000 may be executed in a different order presented and that the order presented in the discussion of FIG. 10 is illustrative. It is further noted that certain steps in method 1000 may be executed in a substantially simultaneous manner.

A detail description of another embodiment of the present invention of stall/reorder unit 403 is provided below in association with FIG. 11.

Figure 11:
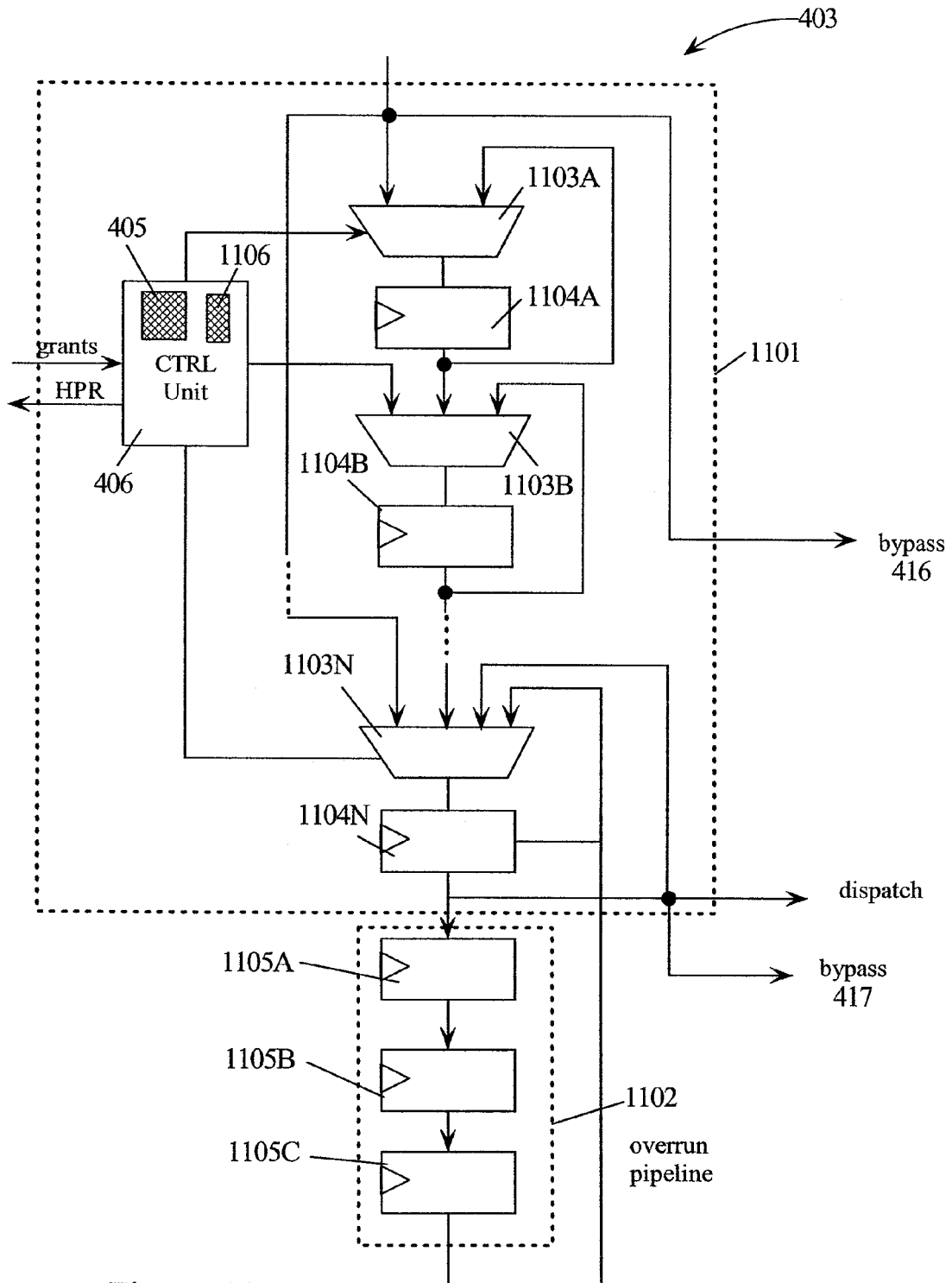
FIG. 11 is another embodiment of the present invention of stall/reorder unit.

FIG. 11—Another Embodiment of Stall/Reorder Unit

Referring to FIG. 11, stall/reorder unit 403 includes a top section 1101 designated as "pipeline" and a bottom section 1102 designated as "overrun pipeline". Pipeline 1101 includes a plurality of multiplexers 1103A-N, where N is any number. Multiplexers 1103A-N may collectively or individually be referred to as multiplexers 1103 or multiplexer 1103, respectively. Pipeline 1101 may further include a plurality of latches 1104A-N coupled to multiplexers 1103A-N. Latches 1104A-N may collectively or individually be referred to as latches 1104 or latch 1104, respectively. Pipeline 1101 may further include control unit 406 as described in FIG. 4.

Overrun pipeline 1102 may include a plurality of latches 1105A-C. Latches 1105A-C may collectively or individually be referred to as latches 1105 or latch 1105, respectively. It is noted overrun pipeline 1102 may include any number of latches 1105 which are used to temporarily store the snoop request (address, type, etc.) for the number of clock cycles it takes for arbiter 407 to inform control unit 406 as to whether the snoop request sent by stall/reorder unit 403 was selected or not selected by arbiter 407. A more detail description of the function of overrun pipeline 1102 is provided below. It is noted that stall/reorder unit 403 may include additional elements than depicted but were not depicted for ease of understanding. It is further noted that when it is discussed herein that a snoop request is stored in a latch 1104 or 1105 that it refers to the storing of the address, type, etc. for that snoop request in latch 1104 or latch 1105.

The embodiment of stall/reorder unit 403 described in FIG. 11 is used under the condition that the snoop request is dispatched to multiplexer 401 without being informed as to whether the snoop request was accepted or rejected by arbiter 407 for several clock cycles thereafter. That is, control unit 406 is informed as to whether arbiter 407 accepted or rejected a snoop request dispatched to multiplexer 401 several clock cycles, such as three clock cycles, following the issuance of the snoop request. A description of stall/reorder unit 403 handling this condition is provided further below.

Referring to FIG. 11, in conjunction with FIG. 4, an incoming snoop request may be transmitted on bypass 416 when latches 1104 are full and there is no shift operation, as described below, about to occur. If latches 1104 are not full, then the incoming snoop request is inputted to multiplexers 1103. Multiplexers 1103 also receive as inputs the stored snoop request (address, type, etc. of snoop request) in the succeeding latch 1104 and the stored snoop request in the preceding latch 1104 except for multiplexer 1103A. Multiplexer 1103N includes an additional input for receiving the output of latch 1105C in overrun pipeline 1102 as discussed further below.

As to which input of multiplexer 1103 will be selected, control unit 406 issues a command to each multiplexer 1103 to perform the following actions. Control unit 406 may issue a command to each multiplexer 1103 to "shift-down". Shift down may refer to multiplexers 1103 outputting the stored snoop request, if any, in the preceding latch 1104 and the last latch 1104N in the stack of latches 1104 outputting the snoop request to either multiplexer 401 or to bypass line 417 based on whether the count value associated with the snoop request is n clock cycles. The count value associated with the snoop request may be determined by counters 405 as described above in FIG. 4. In one embodiment, counters 405 may reside in control unit 406.

Control unit 406 may further issue a command to each multiplexer 1103 to "hold." Hold may refer to multiplexers 1103 outputting the snoop request stored in the succeeding latch 1104.

Control unit 406 may further issue a command to a particular multiplexer 1103 to output the incoming snoop request in the first available latch 1104. The first available latch 1104 may refer to the first latch 1104 that does not store any information about a snoop request during a hold operation as described above. The first available latch 1104 may also refer to latch 1104 that does not store any information about a snoop request following a shift-down operation as described above.

As stated above, in this embodiment of stall/reorder unit 403, control unit 406 is not informed as to whether the dispatched snoop request is accepted or rejected by arbiter 407 for several clock cycles after the dispatch occurred. Consequently, a copy of the dispatched snoop request may be inputted to the top latch 1105A in the overrun pipeline 1102 thereby maintaining the information, e.g., address, type, about the snoop request in case the snoop request is rejected by arbiter 407. By maintaining the information, e.g., address, type, about the snoop request, the snoop request may be dispatched again to multiplexer 401 thereby increasing the chances that the snoop request will ultimately be accepted by arbiter 407 and decreasing the number of snoop requests that get rejected.

The dispatched snoop request inputted to the top latch 1105A in the overrun pipeline 1102 will be outputted to the succeeding latch 1105 each clock cycle until residing in the bottom latch 1105C in overrun pipeline 1102. At that time, control unit 406 may be informed by arbiter 407 (indicated by signal labeled "grant") as to whether the previously dispatched snoop request that now resides in the bottom latch 1105C was accepted or rejected by arbiter 407. If control unit 406 is informed by arbiter 407 that the dispatched snoop request was accepted by arbiter 407, then control unit 406 may reset any validity bits of its progeny (copies of the same snoop request stored in latches 1105 above). Each snoop request may have a validity bit associated with it used to indicate whether the operation will potentially be moved from position P2 (described below) to position SA0 (described below) if the operation is not granted at the position P2. These validity bits may be stored in unit 1106 in control unit 406.

If the validity bit associated with the snoop request residing in the bottom latch 1105C of overrun pipeline 1102 indicates that the snoop request is no longer valid, then the information about that snoop request in latch 1105C will be overwritten upon the storing of the next snoop request. If, however, the validity bit associated with the snoop request residing in the bottom latch 1105C of overrun pipeline 1102 indicates that the snoop request is valid, then the information about that snoop request in latch 1105 is inputted to multiplexer 1103N.

Figure 12:
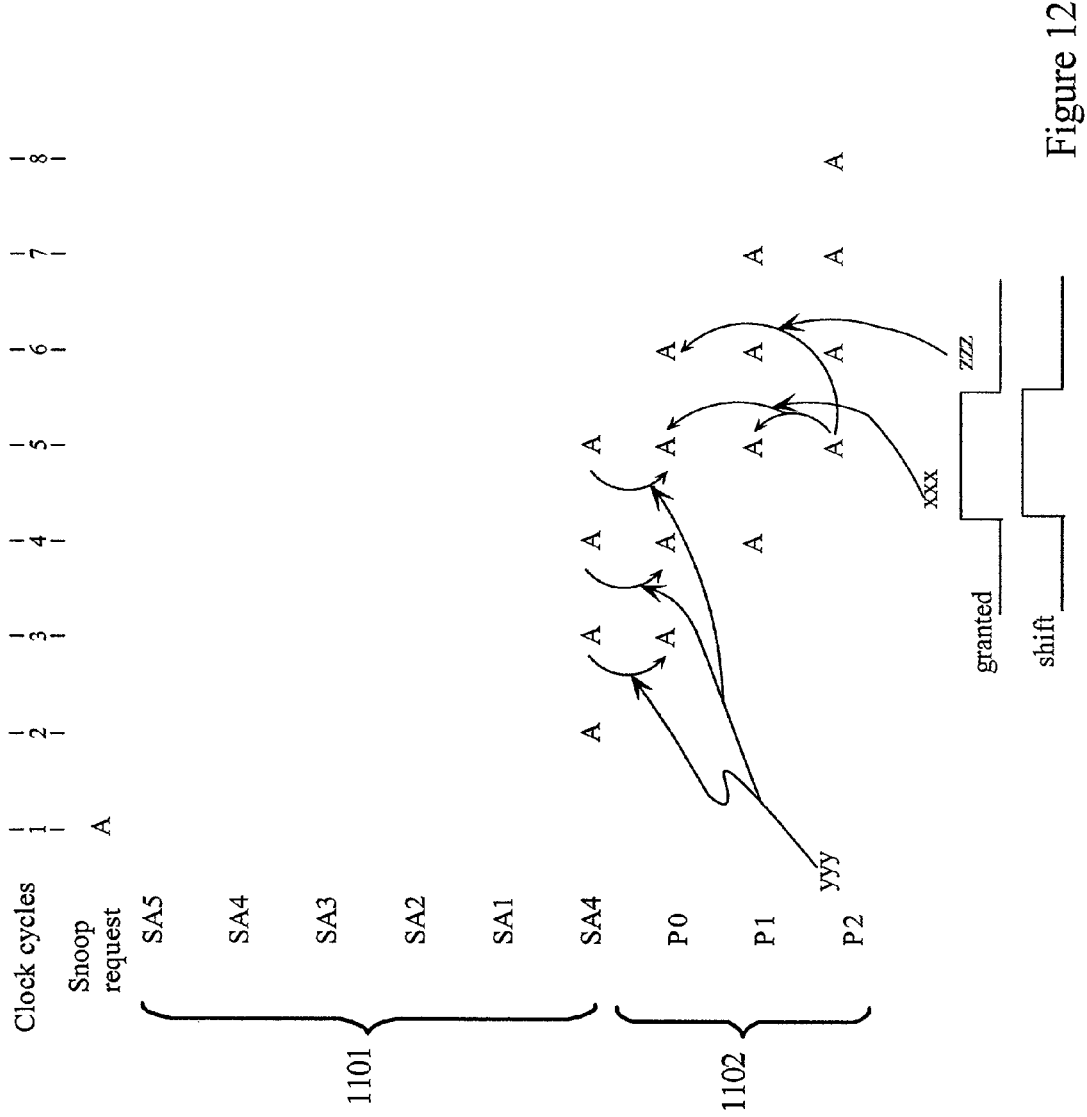
FIG. 12 is a timing diagram illustrating some conditions when a shift-down operation occurs in the pipeline of the stall/reorder unit in accordance with an embodiment of the present invention.
Figure 13:
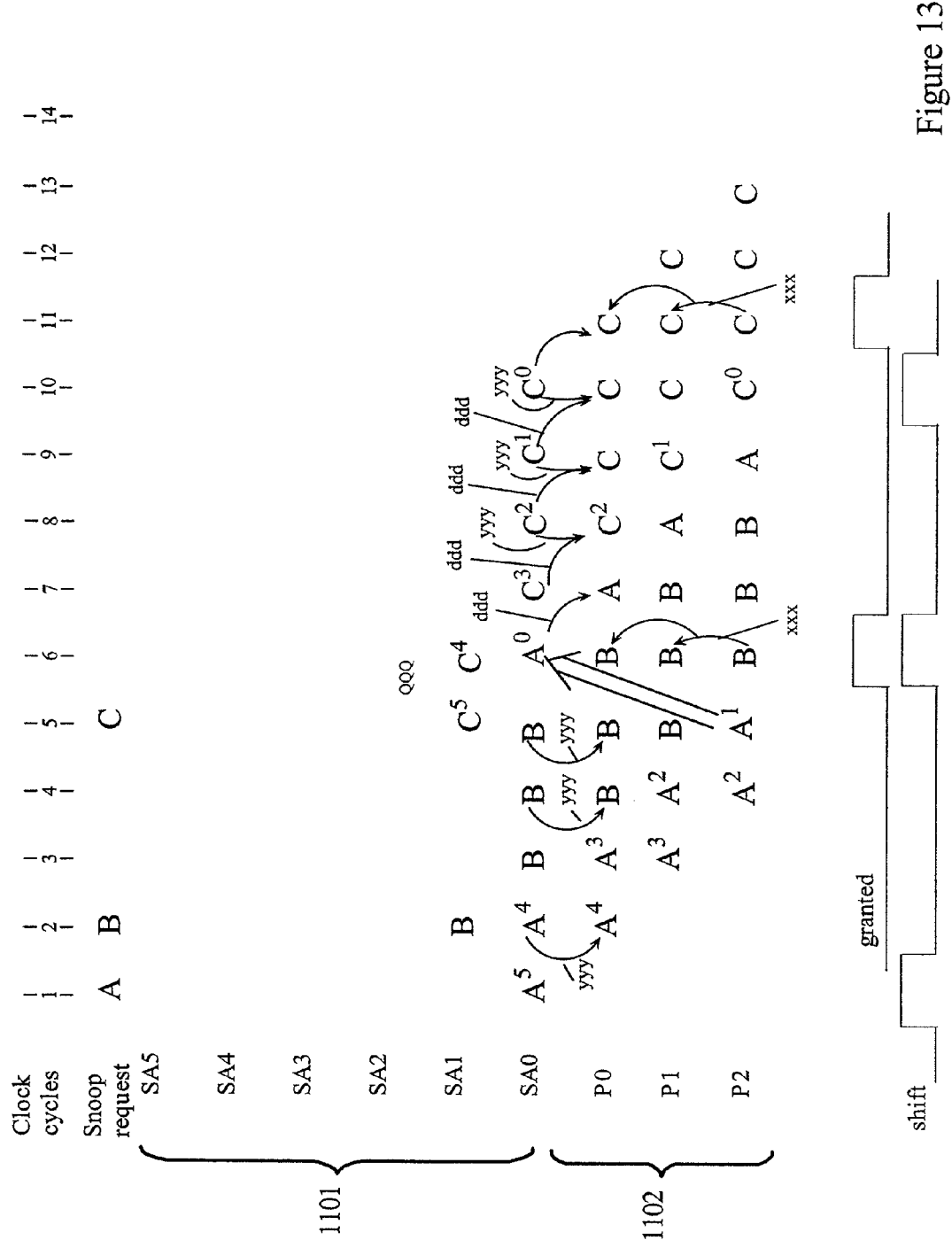
FIG. 13 is an additional timing diagram illustrating other conditions when a shift-down operation occurs in the pipeline of the stall/reorder unit in accordance with an embodiment of the present invention.

As stated above, control unit 406 may issue a command to each multiplexer 1103 to "shift-down". FIGS. 12 and 13 illustrate the conditions as to when a "shift-down" operation would occur. Referring to FIG. 12, in conjunction with FIG. 11, FIG. 12 is a timing diagram illustrating a condition as to when shifting will occur in pipeline 1101. As illustrated in FIG. 12, snoop request A is received in the first clock cycle and then stored in latch 1104N (designated as SA0) in the following clock cycle, clock cycle #2. Each latch 1104 in pipeline 1101 is designated as SA(X) where (X) signifies the position of latch 1104 in the stack of latches 1104. Bottom latch 1104N in pipeline 1101 is designated with a zero and the latch 1104 above bottom latch 1104N is designated with a one and so forth. In the example of FIG. 12, there are six latches 1104 in pipeline 1101. Further, each latch 1105 in overrun pipeline 1102 is designated as P(X) where (X) signifies the position of latch 1105 in the stack of latches 1105. Top latch 1105A in overrun pipeline 1102 is designated with a zero. The latch 1105 (latch 1105B) below top latch 1105A is designated with a one and so forth. In the example of FIG. 12, there are three latches 1105 in overrun pipeline 1102.

Referring to FIG. 12, in the next clock cycle (the third clock cycle), following the storing of snoop request A in latch 1104N, snoop request A is dispatched and stored in latch 1105A in overrun pipeline 1102. A copy of snoop request A is maintained in latch 1104N (referred to as being "represented") as there is no other snoop request in the previous latch 1104 in pipeline 1101 to store in latch 1104N and to be dispatched. When there is no other snoop request in the previous latch 1104 to store in latch 1104N and to be dispatched, it is better to resend the previously dispatched snoop request in case the previous dispatched snoop request was not accepted by arbiter 407 than to perform no functionality during that clock cycle. Also during the third clock cycle, a flag, referred to herein as the "represent flag", used to indicate whether that snoop request will be represented, is cleared for the snoop request stored in latch 1105A. By clearing the represent flag, as indicated by the label "yyy", the snoop request will not be repeated. That occurs since there is already a copy of the snoop request and therefore there is no need to repeat. That is, the operation current at position SA0 will be available to be represented from position P2 to position SA0 in the event that the operation currently at position P0 is not granted. Therefore, the operation currently at position P0 should not represented since the operation currently at position SA0 could potentially be granted at position P2

The following clock cycle, the fourth clock cycle, performs similarly as the third clock cycle. In the fifth clock cycle, when a copy of snoop request A that was dispatched in the second clock cycle is stored in the bottom latch 1105C in overrun pipeline 1102, control unit 406 is notified that it was accepted by arbiter 407. This is indicated by a signal, referred to herein as the "granted" signal, becoming active. When that occurs, the represent flags are cleared for any repeats (same snoop request as stored in latch 1105C) in the latches 1105 above latch 1105C in the overrun pipeline 1102. These are indicated in FIG. 12 with the label of "xxx". Further, the represent flag for a repeat (same snoop request as stored in latch 1105C) is cleared for the repeat stored in latch 1105A in the overrun pipeline 1102 in the following clock cycle, the sixth clock cycle. This is indicated in FIG. 12 with the label of "zzz".

Referring to the fifth clock cycle, when a snoop request that is stored in the bottom latch 1105C of overrun pipeline 1102 is granted and there is an unbroken repeated snoop request stored in the position SA0, then a shift-down operation occurs in pipeline 1101 as indicated by the activation of the signal labeled "shift".

Another illustration of conditions when a shift-down operation occurs in pipeline 1101 is illustrated in FIG. 13. Referring to FIG. 13, in conjunction with FIGS. 11-12, FIG. 13 is a timing diagram illustrating other conditions as to when a shift-down operation will occur in pipeline 1101. FIG. 13 includes superscript numbers for some of the snoop requests indicating the number of clock cycles left until they have been stored in stall/reorder unit 403 for "n" clock cycles. For example, if there is a number four as a superscript for a snoop request, then that would indicate that the snoop request has four clock cycles left until the snoop request has resided in stall/reorder unit 403 for n clock cycles. These counts may be counted by a separate set of counters 405 in control unit 406.

As illustrated in FIG. 13, stall/reorder unit 403 receives snoop request A in the first clock cycle. In the second clock cycle, snoop request A is stored in the first available latch 1104 in pipeline 1101, which in the example presented in FIG. 13 is SA0 (latch 1104N). Further, in the second clock cycle, stall/reorder unit 403 receives snoop request B. In the third clock cycle, snoop request A, stored in latch 1104N is dispatched to multiplexer 401. Further, a copy of snoop request A is stored in latch 1105A in overrun pipeline 1102. Further, in the third clock cycle, snoop request A is repeated in latch 1104N. That is, a copy of the information of snoop request A is maintained in latch 1104N as described above since there was no snoop request stored in the previous latch 1104 in the previous clock cycle. Also, during the third clock cycle, snoop request B is stored in the first available latch 1104 in pipeline 1101, which in the example presented in FIG. 13 is SA1 (corresponds to latch 1104 above latch 1104N). Further, in the third clock cycle, the represent flag for snoop request A stored in latch 1105A is cleared as previously described.

When there is snoop request stored in the position SA1, a shift-down operation may occur in pipeline 1101 as illustrated in the third clock cycle. This is indicated by the shift signal becoming active and the shifting down of snoop request B from being stored in position SA1 in the third clock cycle to being stored in position SA0 (latch 1104N) in the fourth clock cycle.

Clock cycles #4 and #5 perform as described above. Each of the snoop requests stored in latches 1105 in overrun pipeline 1102 are shifted down each clock cycle. Further, after being stored in latch 1104N, snoop request B is dispatched to multiplexer 401 and a copy of snoop request B is stored in latch 1105A in clock cycle #5. Further, snoop request B is repeated in latch 1104N in clock cycle #5 as described above. Further, in clock cycle #5, stall/reorder unit 403 receives snoop request C.

In clock cycle #6, snoop request C is stored in the first available latch 1104 in pipeline 1101, which in the example illustrated in FIG. 13 is position SA1. Further, in clock cycle #6, snoop request B is dispatched to multiplexer 401 and repeated in latch 1104N as described above. Further, the represent flag for snoop request B stored in latch 1105A is cleared as described above. Further, as illustrated in clock cycle #6, snoop request A with a count of 1 (indicating the number of clock cycles until being stored in stall/reorder unit 403 for n clock cycles), is stored in latch 1104N in the following clock cycle, clock cycle #7, as indicated by the label of "qqq".

In clock cycle #7, control unit 406 receives an indication from arbiter 407 that snoop request B stored in latch 1105C was accepted as illustrated by the activation of the granted signal. Further, as stated above, when the snoop request residing in latch 1105C becomes accepted, then represent flags are cleared for any repeats (same snoop request as stored in latch 1105C) in the latches 1105 above latch 1105C in the overrun pipeline 1102. These are indicated in FIG. 13 with the label of "xxx". Further, in clock cycle #7, the represent flag for snoop request A that will be stored in latch 1105A in the following clock cycle, clock cycle #8, will be cleared as indicated by arrow "ddd". This may occur when there is less than a count of 4 since there is not enough clock cycles for the snoop request to proceed through overrun pipeline 1102 and still have enough clock cycles left to not have been stored in stall/reorder unit 403 for n clock cycles. Since the snoop request cannot be dispatched again to multiplexer 401, the represent flag for that snoop request is cleared.

Further, in clock cycle #7, a shift-down operation occurs in pipeline 1101 as indicated by the activation of the shift signal. This occurs when there is a granting of the snoop request stored in latch 1105C and there is a snoop request stored in position SA1, and an operation is not scheduled to be represented from position P2 to position SA0 in the next clock cycle. Further, the shift-down operation occurs in pipeline 1101 in clock cycle #7 since snoop request A has been stored in stall/reorder unit 403 for "n" clock cycles as indicated by the count of zero. When a snoop request has been stored for "n" clock cycles in stall/reorder unit 403, then that snoop request is dispatched to realignment unit 413 via bypass line 417 as described above.

Clock cycles 8-10 perform as described above and will not be described in detail for sake of brevity.

In clock cycle #11, a shift-down operation occurs in pipeline 1101 since snoop request C stored in latch 1104N has been stored in stall/reorder unit 403 for "n" clock cycles as indicated by the count of zero. When a snoop request has been stored for "n" clock cycles in stall/reorder unit 403, then that snoop request is dispatched to realignment unit 413 via bypass line 417 as described above.

Clock cycles 12-14 perform as described above and will not be described in detail for sake of brevity.

Figure 15:
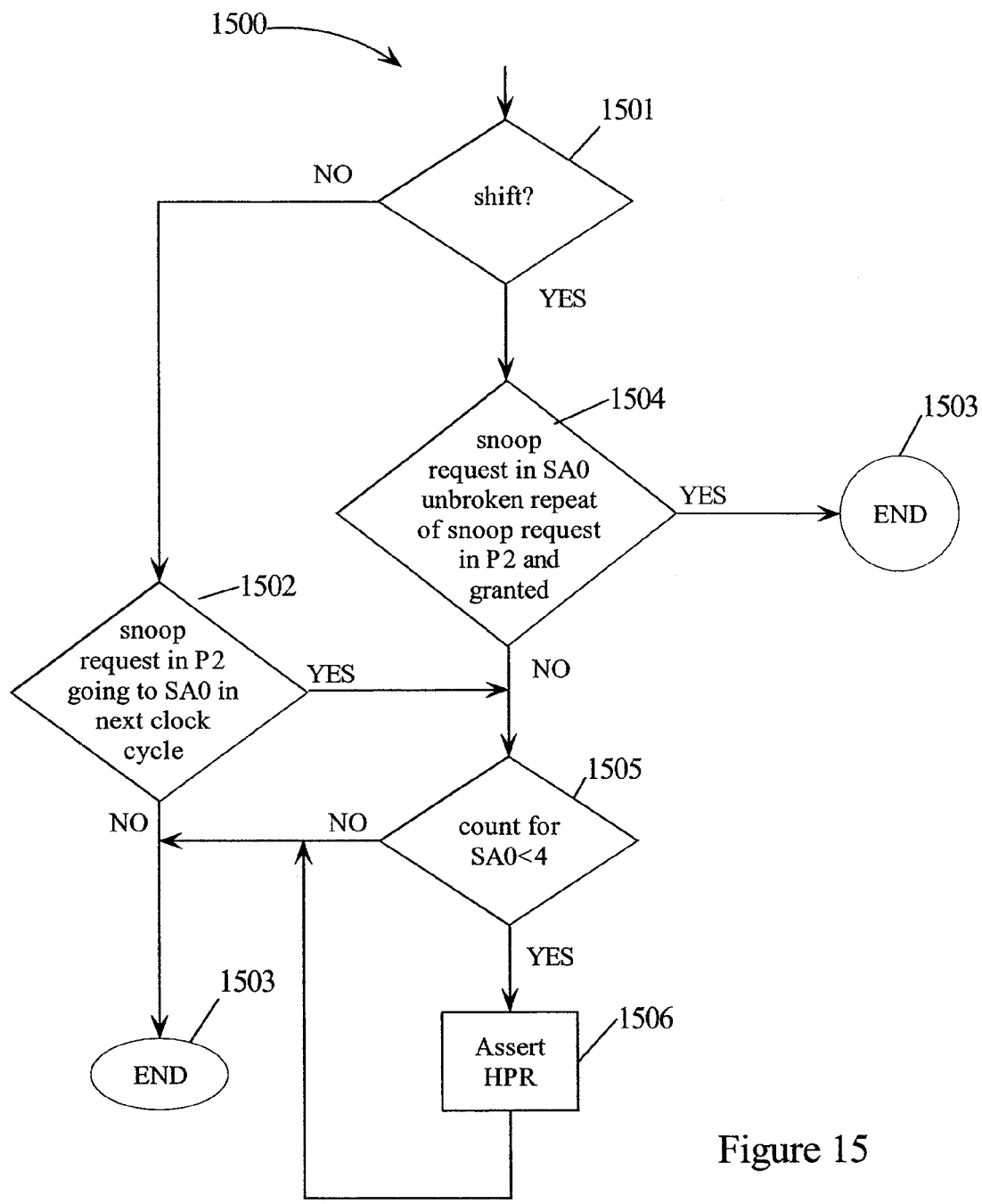
FIG. 15 is a flowchart of a method for issuing a high priority request by the control unit in accordance with an embodiment of the present invention.

Referring to FIG. 11, control unit 406 may output a signal, referred to herein as the "high priority request (HPR)", to arbiter 407 to make a snoop request located in position SA0 to become high priority. A flowchart of a method illustrating control unit 406 outputting an HPR is provided in FIG. 15. Referring to FIG. 15, in conjunction with FIGS. 11-13, FIG. 15 is a flowchart of a method 1500 in accordance with an embodiment of the present invention for outputting an HPR by control unit 406. In step 1501, a determination is made by control unit 406 as to whether a shift-down operation occurs in pipeline 1101. If there is not a shift-down operation in pipeline 1101, then, in step 1502, control unit 406 determines if the snoop request in the position P2 is going to position SA0 in the next clock cycle and if there is a snoop request in the position SA0. If there is a snoop request in the position P2 and is not going to position SA0 in the next clock cycle or if there is not a snoop request in the position SA0, then method 1500 ends at step 1503.

Referring to step 1501, if there is a shift-down operation of pipeline 1101, then, in step 1504, control unit 406 determines if the snoop request in the position SA0 is an unbroken repeat of the snoop request in position P2 and the snoop request in the position P2 is granted. If the snoop request in the position SA0 is an unbroken repeat of the snoop request in position P2 and the snoop request in the position P2 is granted, then method 1500 terminates at step 1503.

If, however, snoop request in the position SA0 is not an unbroken repeat of the snoop request in position P2 or if the snoop request in the position P2 is not granted or if the snoop request in the position P2 is going to position SA0 in the next clock cycle and if there is a snoop request in the position SA0, then, in step 1505, a determination is made by control unit 406 as to whether the count value for the snoop request in position SA0 is less than a given threshold number, e.g., 4, as discussed above. If the count value for the snoop request in position SA0 is less than a given threshold number, then, in step 1506, control unit 406 asserts the HPR signal. Otherwise, method 1500 terminates at step 1503.

A flowchart describing the operation of the embodiment of stall/reorder unit 403 described in FIG. 11 is described below in association with FIGS. 14A-D.

FIGS. 14A-D—Method of Operation of Embodiment of Stall/Reorder Unit Described in FIG. 11

FIG. 14 is a method 1400 of operation of the embodiment of stall/reorder unit 403 (FIG. 4) described in FIG. 11.

Figure 14A:
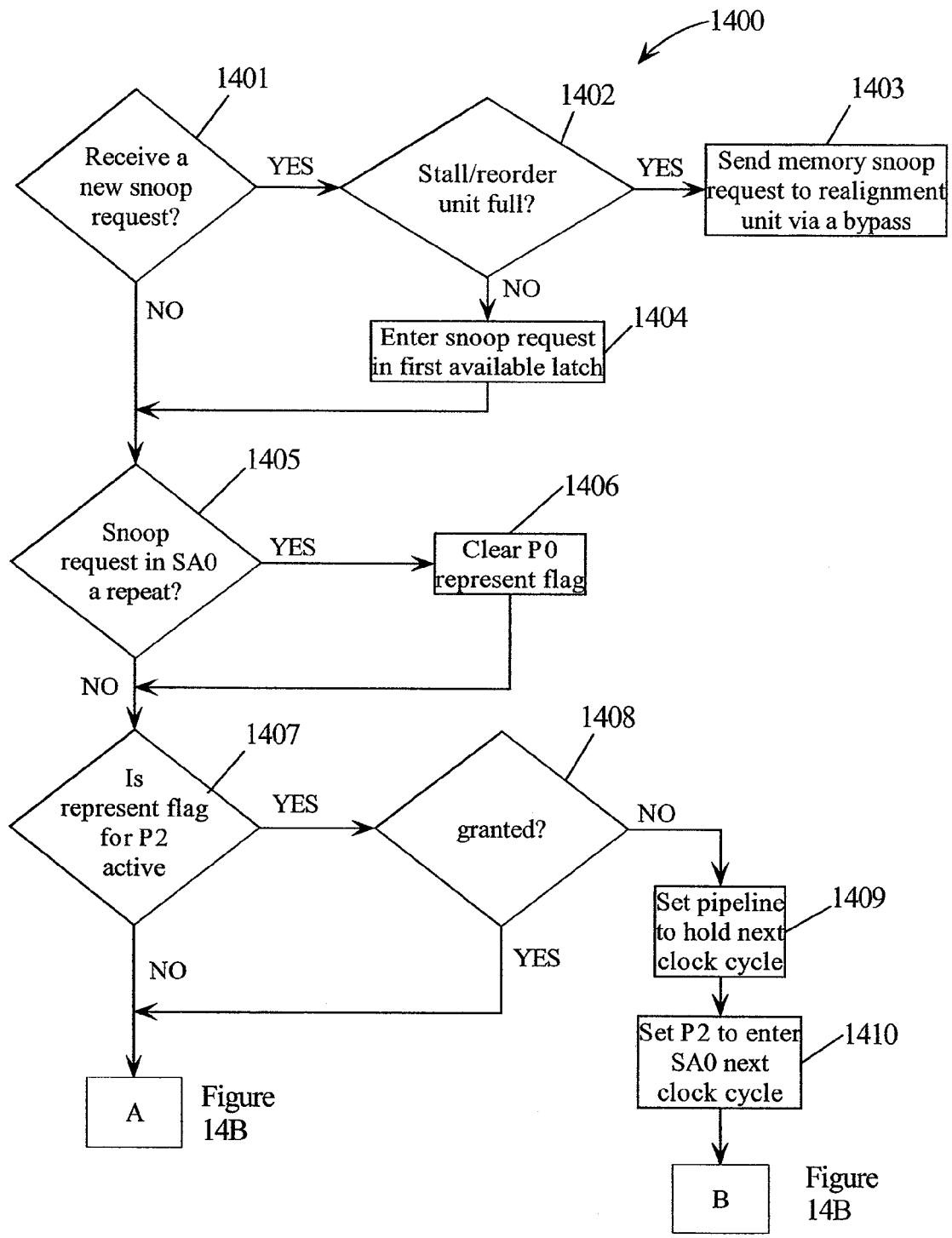
FIGS. 14A-D are a flowchart of a method detailing the operation of the embodiment of stall/reorder unit described in FIG. 11 in accordance with an embodiment of the present invention.

Referring to FIG. 14A, in conjunction with FIGS. 4 and 11-13, in step 1401, a determination is made by stall/reorder unit 403 as to whether it received a new snoop request. If stall/reorder unit 403 received a new snoop request, then, in step 1402, a determination is made by stall/reorder unit 403 as to whether stall/reorder unit 403 is full as described above.

If stall/reorder unit 403 is full, then stall/reorder unit 403 sends the incoming snoop request to realignment unit 413 via bypass 416 in step 1403. If, however, stall/reorder unit 403 is not full, then, in step 1404, the incoming snoop request enters the first available latch 1104.

If stall/reorder unit 403 did not receive a new snoop operation or upon entering the incoming snoop request in the first available latch 1104, then, in step 1405, a determination is made by control unit 406 as to whether the snoop request in position SA0 (latch 1104N) is a repeat as described above.

If the snoop request in position SA0 (latch 1104N) is a repeat, then, in step 1406, control unit 406 clears the represent flag in the snoop request stored in position P0 (latch 1105A).

If the snoop request in position SA0 (latch 1104N) is not a repeat or after control unit 406 clears the represent flag in the snoop request stored in position P0 (latch 1105A), then, in step 1407, control unit 406 determines if the represent flag for the snoop request stored in position P2 (latch 1105C) is active. If the represent flag for the snoop request stored in position P2 is active, then control unit 406 determines if that snoop request was granted at step 1408. If that snoop request was not granted then, in step 1409, control unit 406 sets pipeline 1101 to hold next clock cycle. Further, in step 1410, control unit 406 sets the snoop request stored in position P2 (latch 1105C) to enter the SA0 position (latch 1104N) in the next clock cycle.

Figure 14B:
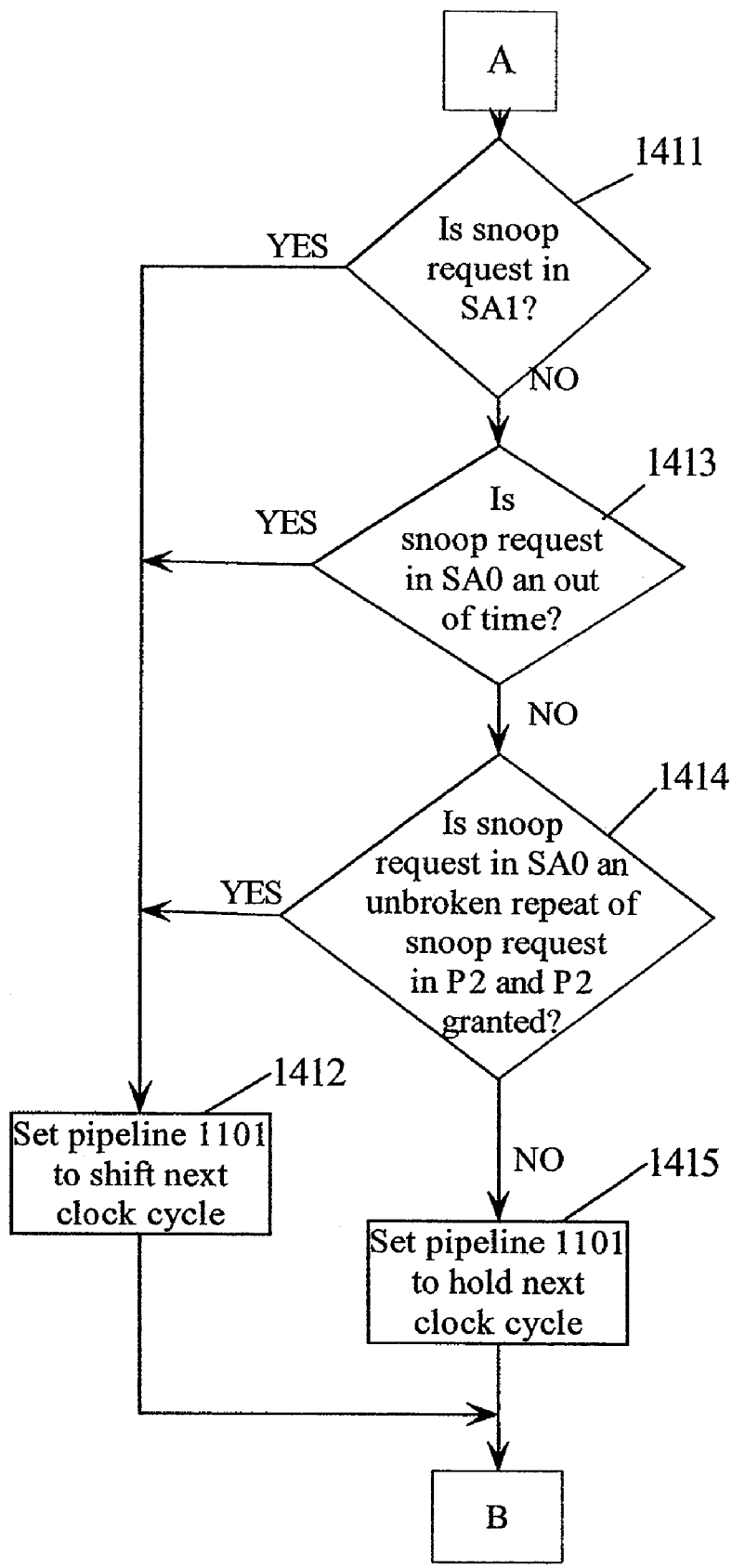
Figure 14C:
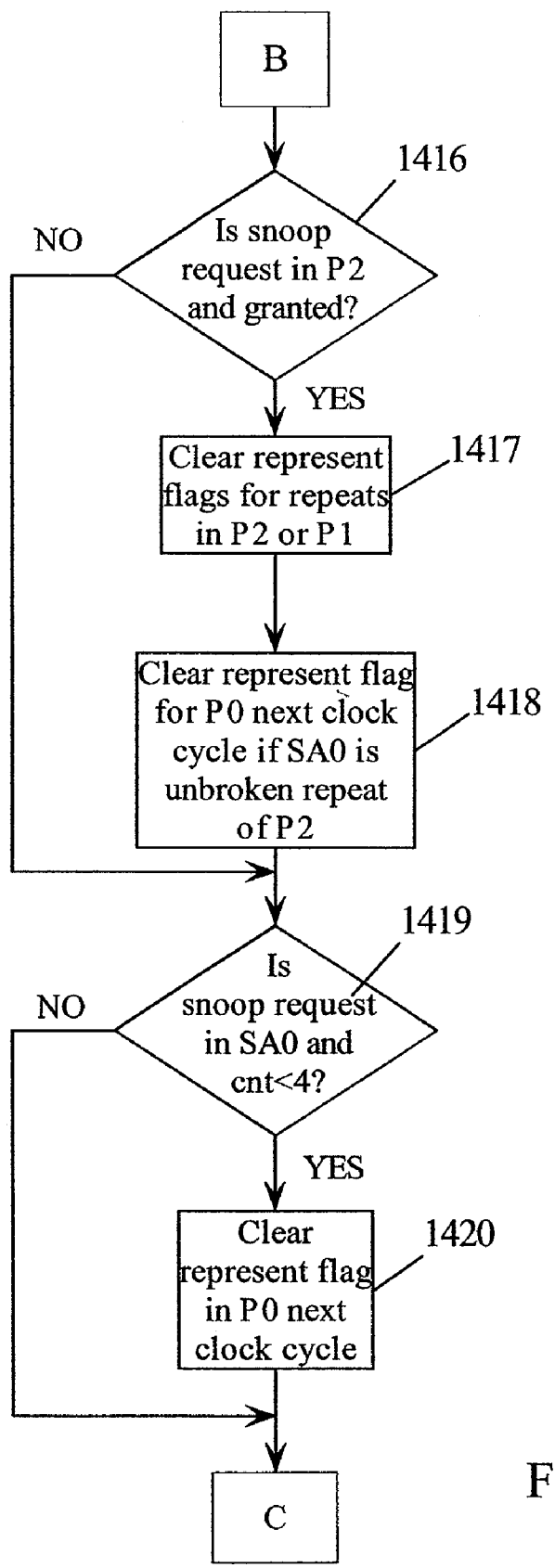

Referring to step 1407, if the represent flag for the snoop request stored at position P2 is not active, then, referring to FIG. 14B, in conjunction with FIGS. 4 and 11-13, a determination is made by control unit 406 as to whether there is a snoop request in position SA1 in step 1411. If there is a snoop request in position SA1, then, in step 1412, control unit 406 sets pipeline 1101 to perform the shift-down operation in the next clock cycle.

If there is no snoop request in position SA1, then, in step 1413, control unit 406 determines if there is a snoop request in the position SA0 and if that snoop request has resided in stall/reorder unit 403 for "n" clock cycles. If there is a snoop request in the position SA0 and that snoop request has resided in stall/reorder unit 403 for "n" clock cycles, then control unit 406 sets pipeline 1101 to perform the shift-down operation in the next clock cycle in step 1412.

If there is not a snoop request in the position SA0 or if there is a snoop request in the position SA0 but that snoop request has not resided in stall/reorder unit 403 for "n" clock cycles, then, in step 1414, control unit 406 determines if there is a snoop request in the position SA0 that is an unbroken repeat of the snoop request stored in the position P2 and if the snoop request stored in the position P2 is granted. If there is a snoop request in the position SA0 that is an unbroken repeat of the snoop request stored in the position P2 and the snoop request stored in the position P2 is granted, then control unit 406 sets pipeline 1101 to perform the shift-down operation in the next clock cycle in step 1412. Otherwise, control unit 406 sets pipeline 1101 to perform the hold operation in the next clock cycle in step 1415.

Upon execution of either step 1410, 1412 or 1415 as described above, referring to FIG. 14C, in conjunction with FIGS. 4 and 11-13, in step 1416, control unit 406 determines if there is a snoop request in the position P2 and if so, is that snoop request granted. If there is a snoop request in the position P2 and if it is granted, then, in step 1417, control unit 406 clears the represent flags for any repeats in the P2 or P1 position. In step 1418, control unit 406 clears the represent flag for the snoop request stored in the P0 position in the next clock cycle if the snoop request stored in the SA0 position is an unbroken repeat of the snoop request stored in position P2.

Upon execution of step 1418 or if there is no snoop request in position P2 or if there is a snoop request in position P2 but is not granted, then, in step 1419, control unit 406 determines if there is a snoop request in the position SA0 and if its count is less than a given threshold number, e.g., four. If there is a snoop request in the position SA0 and its count is less than a given threshold number, then, in step 1420, control unit 406 clears the represent flag for the snoop request stored in the position P0 in the next clock cycle.

Figure 14D:
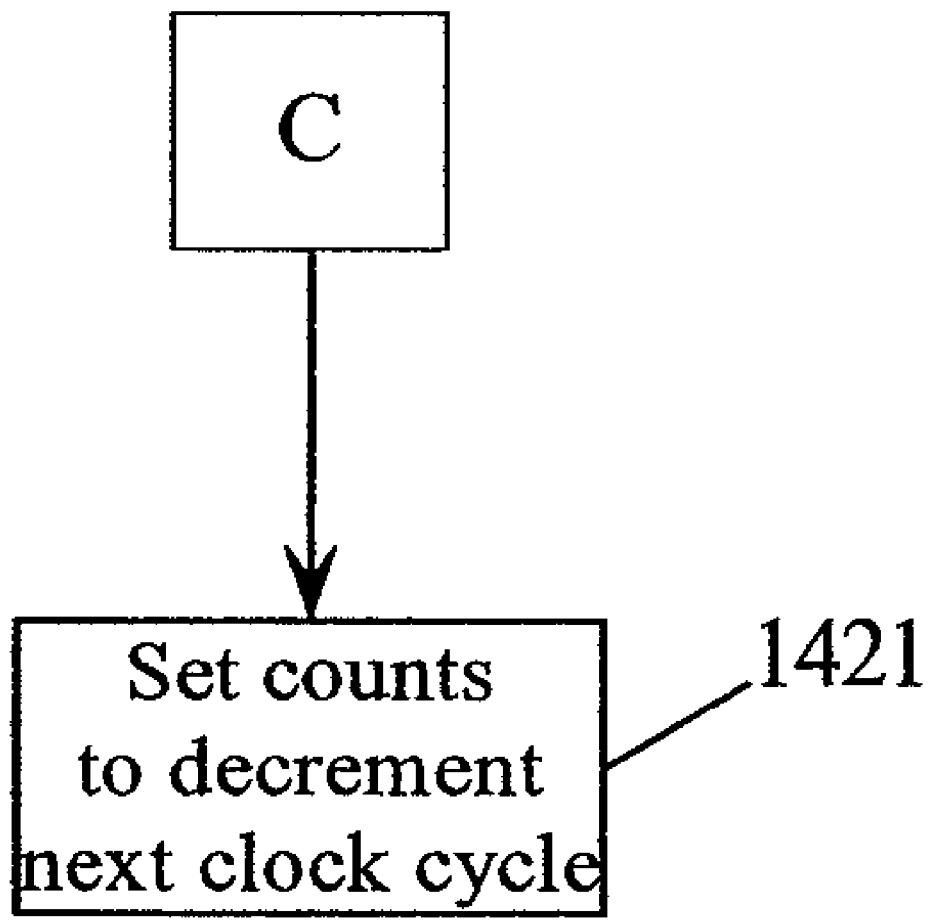

Upon execution of step 1420 or if there is no snoop request stored in position SA0 or if there is a snoop request stored in position SA0 and its count is greater than the threshold number, then, referring to FIG. 14D, in conjunction with FIGS. 4 and 11-13, in step 1421, control unit 406 sets the count values to decrement in the next clock cycle.

It is noted that method 1400 may include other and/or additional steps that, for clarity and brevity, are not depicted. It is further noted that method 1400 may be executed in a different order presented and that the order presented in the discussion of FIGS. 14A-D are illustrative. It is further noted that certain steps in method 1400 may be executed in a substantially simultaneous manner.

Although the system, cache and method are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A cache, comprising:
   a first unit comprising:
   a first pipeline of latches; and
   an overrun pipeline of latches coupled to said first pipeline of latches;
   wherein said first unit is configured to receive a new snoop request, wherein said new snoop request is entered in a first available latch in said first pipeline of latches said first unit when said first unit is not full;

a selector coupled to said first unit, wherein said first unit is configured to dispatch said new snoop request to said selector upon entering a bottom latch in said first pipeline of latches in said first unit, wherein said first unit is further configured to store a copy of said new snoop request in a top latch in said overrun pipeline of latches in said first unit upon dispatching said new snoop request; and an arbitration mechanism coupled to said first unit and to said selector, wherein said arbitration mechanism is configured to send to said first unit an indication as to whether said new snoop request was accepted or rejected, wherein said indication is received by a control unit in said first unit upon said copy of said new snoop request reaching a bottom latch in said overrun pipeline of latches in said first unit.

2. The cache as recited in claim 1, wherein said first unit is further configured to reissue said new snoop request using said copy of said new snoop request stored in said bottom latch in said overrun pipeline of latches in said first unit when said arbitration mechanism indicated that said new snoop request was rejected.

3. The cache as recited in claim 1, wherein said first unit is further configured to clear a flag for a first snoop request residing in said top latch in said overrun pipeline of latches of said first unit when a second snoop request residing in said bottom latch in said first pipeline of latches of said first unit is a repeat, wherein said flag is used to indicate whether said first snoop request will be represented in said bottom latch in said first pipeline of latches of said first unit.

4. The cache as recited in claim 1, wherein said first unit is further configured to set said first pipeline of latches in said first unit to perform a hold operation in a next clock cycle when a flag used to indicate whether a snoop request will be represented in said bottom latch in said first pipeline of latches of said first unit is active for a snoop request residing in said bottom latch in said overrun pipeline of latches in said first unit and is not accepted by said arbitration mechanism.

5. The cache as recited in claim 1, wherein said first unit is further configured to set said first pipeline of latches in said first unit to perform a shift-down operation in a next clock cycle when there is a snoop request stored in a latch preceding said bottom latch in said first pipeline of latches in said first unit.

6. The cache as recited in claim 1, wherein said first unit is further configured to set said first pipeline of latches in said first unit to perform a shift-down operation in a next clock cycle when there is a first snoop request stored in said bottom latch in said first pipeline of latches in said first unit and said snoop request has resided in said first unit n clock cycles.

7. The cache as recited in claim 1, wherein said first unit is further configured to set said first pipeline of latches in said first unit to perform a shift-down operation in a next clock cycle when a first snoop request stored in said bottom latch in said first pipeline of latches of said first unit is an unbroken repeat of a second snoop request stored in said bottom latch in said overrun pipeline of latches of said first unit and said second snoop request is accepted by said arbitration mechanism.

8. A system, comprising:
a processor; and
a cache coupled to said processor, wherein said cache comprises:
a first unit comprising:
a first pipeline of latches; and
an overrun pipeline of latches coupled to said first pipeline of latches;
wherein said first unit is configured to receive a new snoop request, wherein said new snoop request is entered in a first available latch in said first pipeline of latches in said first unit when said first unit is not full;

a selector coupled to said first unit, wherein said first unit is configured to dispatch said new snoop request to said selector upon entering a bottom latch in said first pipeline of latches in said first unit, wherein said first unit is further configured to store a copy of said new snoop request in a top latch in said overrun pipeline of latches in said first unit upon dispatching said new snoop request; and an arbitration mechanism coupled to said first unit and to said selector, wherein said arbitration mechanism is configured to send to said first unit an indication as to whether said new snoop request was accepted or rejected, wherein said indication is received by a control unit in said first unit upon said copy of said new snoop request reaches a bottom latch in said overrun pipeline of latches in said first unit.

9. The system as recited in claim 8, wherein said first unit is further configured to reissue said new snoop request using said copy of said new snoop request stored in said bottom latch in said overrun pipeline of latches in said first unit when said arbitration mechanism indicated that said new snoop request was rejected.

10. The system as recited in claim 8, wherein said first unit is further configured to set said first pipeline of latches in said first unit to perform a hold operation in a next clock cycle when a flag used to indicate whether a snoop request will be represented in said bottom latch in said first pipeline of latches of said first unit is active for a snoop request residing in said bottom latch in said overrun pipeline of latches in said first unit and is not accepted by said arbitration mechanism.

11. The system as recited in claim 8, wherein said first unit is further configured to set said first pipeline of latches in said first unit to perform a shift-down operation in a next clock cycle when there is a snoop request stored in a latch preceding said bottom latch in said first pipeline of latches in said first unit.

12. The system as recited in claim 8, wherein said first unit is further configured to set said first pipeline of latches in said first unit to perform a shift-down operation in a next clock cycle when there is a snoop request stored in said bottom latch in said first pipeline of latches in said first unit and said snoop request has resided in said first unit n clock cycles.

13. The system as recited in claim 8, wherein said first unit is further configured to set said first pipeline of latches in said first unit to perform a shift-down operation in a next clock cycle when a first snoop request stored in said bottom latch in said first pipeline of latches of said first unit is an unbroken repeat of a second snoop request stored in said bottom latch in said overrun pipeline of latches of said first unit and said second snoop request is accepted by said arbitration mechanism.

* * * * *